(12) United States Patent
Liu

(10) Patent No.: US 11,625,729 B2
(45) Date of Patent: Apr. 11, 2023

(54) DATA PROCESSING METHOD, APPARATUS, AND SYSTEM

(71) Applicant: Alibaba Group Holding Limited, Grand Cayman (KY)

(72) Inventor: Yufu Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 589 days.

(21) Appl. No.: 15/875,954

(22) Filed: Jan. 19, 2018

(65) Prior Publication Data
US 2018/0144348 A1 May 24, 2018

Related U.S. Application Data

(63) Continuation of application No. PCT/CN2016/089595, filed on Jul. 11, 2016.

(30) Foreign Application Priority Data

Jul. 20, 2015 (CN) .......................... 201510427882.4

(51) Int. Cl.
*G06Q 30/00* (2012.01)
*G06F 21/44* (2013.01)
(Continued)

(52) U.S. Cl.
CPC ......... *G06Q 30/0185* (2013.01); *G06F 21/44* (2013.01); *G06F 21/55* (2013.01);
(Continued)

(58) Field of Classification Search
CPC ..... G06Q 30/00; G06Q 30/0185; H04W 4/02; H04W 4/023; G06F 21/44
(Continued)

(56) References Cited

U.S. PATENT DOCUMENTS 9,071,969 B2 * 6/2015 Turgeman ............... G06F 21/32
9,355,231 B2 * 5/2016 Disraeli ................. H04L 63/083
(Continued)

FOREIGN PATENT DOCUMENTS

CN 102034182 A 4/2011
CN 103309885 9/2013
(Continued)

OTHER PUBLICATIONS

Google Patents' English language translation of WO-2016034063-A1. (Year: 2016).*
(Continued)

*Primary Examiner* — Ayal I. Sharon
(74) *Attorney, Agent, or Firm* — Lee & Hayes, P.C.

(57) ABSTRACT

A server receives target data sent by a mobile terminal, the target data carrying a parameter set, the parameter set including at least a target posture parameter of the mobile terminal. When the amount of change in posture variation is smaller than the preset variation threshold, such fact indicates that the posture when the mobile terminal sends the target data hardly changes compared with the postures that the mobile terminal historically sends the target data to the server. As the posture of the mobile terminal is frequently changed during the process of normal use of the mobile terminal, the target data sent by the mobile terminal without posture change is regarded as false data. Thus, the present techniques ensure the fairness and efficiency of data processing.

16 Claims, 15 Drawing Sheets

(51) Int. Cl.
*H04W 4/02* (2018.01)
*H04W 48/02* (2009.01)
*G06F 21/55* (2013.01)
*G06Q 30/018* (2023.01)
*G06Q 30/0601* (2023.01)
*G06Q 30/06* (2023.01)
*H04L 65/40* (2022.01)
*G06F 17/12* (2006.01)
*H04W 84/12* (2009.01)
*H04W 88/02* (2009.01)

(52) U.S. Cl.
CPC ........ *G06Q 30/0601* (2013.01); *H04W 4/023* (2013.01); *H04W 48/02* (2013.01); *G06F 17/12* (2013.01); *H04L 65/40* (2013.01); *H04W 84/12* (2013.01); *H04W 88/02* (2013.01)

(58) Field of Classification Search
USPC .......................................................... 705/318
See application file for complete search history.

(56) References Cited

U.S. PATENT DOCUMENTS

| | | | | |
|---|---|---|---|---|
| 9,578,458 | B2* | 2/2017 | Pan | H04L 61/6022 |
| 2004/0023654 | A1* | 11/2004 | Rappaport | |
| 2005/0185618 | A1* | 8/2005 | Friday | H04B 17/318 |
| | | | | 370/331 |
| 2006/0019679 | A1* | 1/2006 | Rappaport | G01S 5/0252 |
| | | | | 455/456.5 |
| 2008/0084858 | A1* | 4/2008 | Hart | H04W 64/00 |
| | | | | 370/342 |
| 2009/0042633 | A1* | 2/2009 | Yacenda | G07F 17/32 |
| | | | | 463/17 |
| 2009/0137304 | A1* | 5/2009 | Yacenda | G07F 17/3237 |
| | | | | 463/17 |
| 2010/0075697 | A1* | 3/2010 | Gupta | H04W 4/029 |
| | | | | 455/456.3 |
| 2010/0217677 | A1 | 8/2010 | Hershey et al. | |
| 2012/0094639 | A1* | 4/2012 | Carlson | G06Q 20/401 |
| | | | | 455/414.1 |
| 2012/0136573 | A1* | 5/2012 | Janardhanan | G01C 21/20 |
| | | | | 701/512 |
| 2013/0036037 | A1* | 2/2013 | Meredith | H04W 4/02 |
| | | | | 705/35 |
| 2013/0090881 | A1* | 4/2013 | Janardhanan | G06F 1/163 |
| | | | | 702/104 |
| 2013/0102283 | A1* | 4/2013 | Lau | G06Q 30/0251 |
| | | | | 455/411 |
| 2013/0197998 | A1* | 8/2013 | Buhrmann | G06Q 20/4016 |
| | | | | 705/14.53 |
| 2013/0247117 | A1* | 9/2013 | Yamada | G08C 17/02 |
| | | | | 725/93 |
| 2013/0288594 | A1 | 10/2013 | Yeh | |
| 2013/0288647 | A1* | 10/2013 | Turgeman | G06F 3/041 |
| | | | | 455/411 |
| 2014/0137199 | A1* | 5/2014 | Hefetz | G06F 21/73 |
| | | | | 726/3 |
| 2014/0279494 | A1* | 9/2014 | Wiesman | G06Q 20/3224 |
| | | | | 705/44 |
| 2015/0040193 | A1* | 2/2015 | Clemons | G06F 21/40 |
| | | | | 726/4 |
| 2015/0120550 | A1* | 4/2015 | Jung | G06Q 20/3224 |
| | | | | 705/44 |
| 2015/0186891 | A1* | 7/2015 | Wagner | G06Q 20/4016 |
| | | | | 705/39 |
| 2015/0264572 | A1* | 9/2015 | Turgeman | G06F 3/0485 |
| | | | | 455/411 |
| 2015/0319563 | A1* | 11/2015 | Johnson | H04W 4/02 |
| | | | | 455/456.3 |
| 2016/0171499 | A1* | 6/2016 | Meredith | G06Q 20/3224 |
| | | | | 705/44 |
| 2016/0248771 | A1* | 8/2016 | Huang | H04L 63/0876 |
| 2016/0301674 | A1* | 10/2016 | Uetabira | G06F 21/31 |
| 2017/0011382 | A1* | 1/2017 | Zoldi | G06Q 20/3827 |
| 2018/0144348 | A1 | 5/2018 | Liu | |
| 2019/0190911 | A1* | 6/2019 | Huang | H04L 63/0876 |
| 2020/0210781 | A1* | 7/2020 | Desilets-Benoit | G06K 9/6274 |

FOREIGN PATENT DOCUMENTS

| | | | | |
|---|---|---|---|---|
| CN | 103530772 | A | | 1/2014 |
| CN | 103874021 | A | | 6/2014 |
| CN | 104616183 | | | 5/2015 |
| CN | 104794615 | A | | 7/2015 |
| CN | 104954675 | B | * | 9/2018 |
| CN | 109814704 | A | * | 5/2019 |
| JP | 2004204629 | A | | 7/2004 |
| JP | 2007278871 | A | | 10/2007 |
| JP | 2008544339 | A | | 12/2008 |
| JP | WO2014132431 | A1 | | 2/2017 |
| WO | WO-9922333 | A1 | * | 5/1999 ......... G06K 7/10128 |
| WO | WO-2012073233 | A1 | * | 6/2012 ............. G06F 21/31 |
| WO | WO-2015057256 | A3 | * | 11/2015 ......... G06F 21/316 |
| WO | WO-2016034063 | A1 | * | 3/2016 .............. H04W 4/14 |

OTHER PUBLICATIONS

Google Patents' English language translation of CN-104954675-B. (Year: 2018).*
CN109814704A—Google English Translation. https://patents.google.com/patent/CN109814704A/en?oq=CN109814704A (Year: 2022).*
Japanese Office Action dated Feb. 4, 2020 for Japanese Patent Application No. 2018-502716, a counterpart foreing application of the U.S. Appl. No. 15/875,954, 6 pages.
Translation of International Search Report from corresponding PCT application No. PCT/CN2016/089595 dated Oct. 8, 2016, 2 pages.
Translation of Written Opinion from corresponding PCT application No. PCT/CN2016/089595 dated Oct. 8, 2016, 6 pages.
Translation of Chinese Search Report dated Jun. 25, 2019, from corresponding CN Patent Application No. 2015104278824, 2 pages.
Extended European Search Report dated Dec. 17, 2018 for European Patent Application No. 16827173.2, 7 pages.
Written Opinion dated May 7, 2020, issued by the Japan Patent Office in counterpart Application No. JP 2018-502716, 1 page.
English-language translation of Written Opinion dated May 7, 2020, issued by the Japan Patent Office in counterpart Application No. JP 2018-502716, 2 pages.
Second Office Action issued by the China Patent Office dated Mar. 20, 2020, in counterpart Application No. CN 201510427882, 7 pages.
English-language translation of Second Office Action issued by the China Patent Office dated Mar. 20, 2020, in counterpart Application No. CN 201510427882, 10 pages.
English translation of Chinese Search Report dated Nov. 12, 2020, from corresponding CN Patent Application No. 201510427882.4, 1 page.
English translation of First Office Action issued by the Chinese Patent Office dated Jul. 3, 2019, in counterpart Application No. CN 201510427882.4, 9 pages.
English translation of Third Office Action issued by the Chinese Patent Office dated Aug. 5, 2020, in counterpart Application No. CN 201510427882.4, 6 pages.
EP Office Action from corresponding U.S. Appl. No. 15/875,954 dated Mar. 15, 21, a counterpart foreign application for U.S. Appl. No. 15/875,954, 7 pages.
Kim et al., "Wi-Fi Positioning Systems: Beware of Unintended Consequences Issues Involving the Unforeseen Uses of Pre-existing Architecture," https://www.identityblog.com/wp-content/images/2011/06/beware_of_unintended_consequences.pdf, Jun. 30, 2011, pp. 1-28.

* cited by examiner

```
┌─────────────────────────────────────────────────────────────┐
│ WHEN THERE ARE MULTIPLE SENDING TIMES OF HISTORICAL DATA,   │
│ CALCULATE TIME INTERVALS OF SENDING TIMES OF ADJACENT       │
│ HISTORICAL DATA RESPECTIVELY                                │
│                         S402                                │
└─────────────────────────────────────────────────────────────┘
                              │
                              ▼
┌─────────────────────────────────────────────────────────────┐
│ CALCULATE TIME INTERVAL BETWEEN SENDING TIME OF TARGET DATA │
│ AND LAST TIME THAT MOBILE TERMINAL SENDS DATA               │
│                         S404                                │
└─────────────────────────────────────────────────────────────┘
                              │
                              ▼
┌─────────────────────────────────────────────────────────────┐
│ CALCULATE AVERAGE VALUE OF ALL TIME INTERVALS, AND USE      │
│ AVERAGE VALUE AS TIME INTERVAL THAT MOBILE TERMINAL SENDS   │
│ DATA                                                        │
│                         S406                                │
└─────────────────────────────────────────────────────────────┘
```

FIG. 4

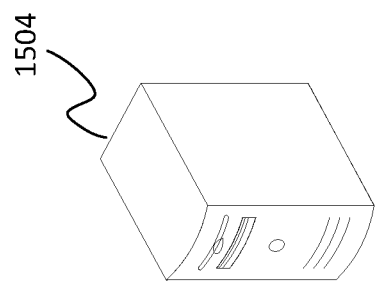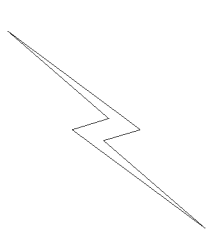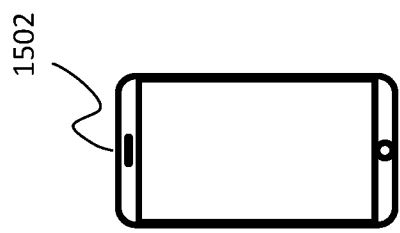
FIG. 15

DATA PROCESSING METHOD, APPARATUS, AND SYSTEM

CROSS REFERENCE TO RELATED PATENT APPLICATIONS

This application claims priority to and is a continuation of PCT Patent Application No. PCT/CN2016/089595, filed on 11 Jul. 2016, which claims priority to Chinese Patent Application No. 201510427882.4, filed on 20 Jul. 2015, entitled "Data Processing Method, Apparatus, and System," which are hereby incorporated by reference in their entirety.

TECHNICAL FIELD

The present disclosure relates to the field of Internet technologies, and particularly to a data processing method, apparatus, and system.

BACKGROUND

With the development of network technology, electronic business platform is becoming mature and is developing rapidly, and has become an important shopping channel in people's lives. When people shop through a electronic business platform, they usually prefer high reputation shops or high sales of merchandise. After understanding consumer shopping psychology, criminals send false data electronic to the electronic business platform to achieve or enhance the credibility of shops for selling purposes.

With the increasing popularity of mobile terminals, criminals have gradually begin to use the mobile terminal to send false data to the electronic business platform to achieve false trading, etc. to enhance the credibility of the shops or sales. The conventional technologies for identifying false data only identify false data sent by the PC machine. Thus, there is a need of a method for identifying false data sent by the mobile terminals.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The term "technique(s) or technical solution(s)" for instance, may refer to apparatus(s), system(s), method(s) and/or computer-readable instructions as permitted by the context above and throughout the present disclosure. The present disclosure provides a method and device for multi-display interaction, which makes the interaction process more vivid and real, which improves the user engagement.

In view of this, the present disclosure provides a data processing method and apparatus for identifying false data transmitted by mobile terminals, thereby maintaining an ordinary transaction course of an electronic business platform.

The present disclosure provides the following technical solutions:

The present disclosure provides a data processing method comprising:

receiving target data sent by a mobile terminal, the target data carrying a parameter set, the parameter set including at least a target posture parameter of the mobile terminal;

obtaining historical parameter set in historical data corresponding to the mobile terminal, the historical parameter set including at least a historical posture parameter of the mobile terminal; and in response to determining that the parameter set satisfies a preset condition according to the historical parameter set, determining that the target data is false data, the parameter set satisfying the preset condition including at least that a posture variation between the target posture parameter in the parameter set and the historical posture parameter in the historical parameter set is less than a preset variation threshold.

For example, the target posture parameter includes an angle $\alpha_1$ between the mobile terminal and the magnetic north, an angle of rotation $\beta_1$ that the mobile terminal is rotated about the horizontal axis X, an angle of rotation $\gamma_1$ that the mobile terminal is rotated about the horizontal axis Z. The historical posture parameter includes a historical angle $\alpha_2$ between the mobile terminal and the magnetic north, an angle of rotation $\beta_2$ that the mobile terminal is rotated about the horizontal axis X, an angle of rotation $\gamma_2$ that the mobile terminal is rotated about the horizontal axis Z.

Thus, the posture variation determined by the target posture parameter and the historical posture parameter is determined, which includes using the value arising from the formula $\sqrt{(\alpha-\alpha_2)^2-(\beta-\beta_2)^2-(\gamma-\gamma_2)^2}$ as the posture variation.

For example, the parameter set also includes a sending time of the target data. The parameter set satisfying the preset condition also includes that a time interval that the mobile terminal sends data is less than a predetermined time length. The time interval is determined by the sending time of the target data and the sending time of the historical data in the historical parameter set.

For example, the determining the time interval includes: using a latest time that the mobile terminal sends data as the sending time of the historical data. The time difference between the sending time of the target data and the sending time of the historical data.

For example, the parameter set also includes a location identifier of the mobile terminal. The parameter set satisfying the preset condition also includes that the locations of the mobile terminal and the set of historical false terminal are within a preset range according to the location identifier. The set of historical false terminal includes one or more historical false terminals.

For example, when the set of historical false terminal includes multiple historical false terminals, the distance between adjacent historical false terminals is less than a preset distance threshold.

For example, the location identifier includes latitude and longitude data, a base station identifier, and/or a WIFI hotspot identifier of the mobile terminal when the mobile terminal sends the target data.

The determining process that the locations of the mobile terminal and the set of historical false terminal are within a preset range according to the location identifier includes:

determining latitude and longitude data of the set of historical false terminal; calculating a distance between the latitude and longitude data of the mobile terminal that sends the target data and the latitude and longitude data of the set of historical false terminal; in response to determining that the distance is less than a preset distance threshold, determining that the locations of the mobile terminal and the set of historical false terminal are within the preset range;

determining the base station identifier of the set of historical false terminal; in response to determining that the base station identifier of the base station that the mobile terminal uses to send the target data coincides with the base station identifier of the set of historical false terminal, determining that the locations of the mobile terminal and the set of historical false terminal are within the preset range; or determining a WIFI hot spot identifier of the set of historical false terminal; in response to determining that the WIFI hot spot identifier of the WIFI hot spot that the mobile terminal uses to send the target data coincides with the WIFI hot spot of the set of historical false terminal, determining that the locations of the mobile terminal and the set of historical false terminal are within the preset range.

For example, the latitude and longitude data of the set of historical false terminal includes the latitude and longitude data of the center points of the shapes of various historical false terminals in the set of historical false terminal.

For example, the base station identifier is the Cell Global Identifier (CGI).

The WIFI hotspot identifier is the service set identifier SSID or basic service set identification (BSSID).

For example, if the parameter set meets a preset condition, after determining that the target data is false data, the method further includes:

blocking the false data; and determining that the mobile terminal is a false terminal.

For example, if parameter set does not meet a preset condition, in response to the target data, the response information is sent to the mobile terminal.

For example, the target data is target transaction data and the historical data is the historical transaction data.

The present disclosure provides another data processing method comprising:

generating target data, the target data carrying a parameter set, the parameter set including at least a target posture parameter of the mobile terminal, the parameter set being a basis to determine that the target data is false data such that a server obtains a historical parameter set in historical data corresponding to the mobile terminal and, in response to determining that the parameter set satisfies a preset condition according to the historical parameter set, determines that the target data is false data, the historical parameter set including at least a historical posture parameter of the mobile terminal, the parameter set satisfying the preset condition including at least that a posture variation between the target posture parameter in the parameter set and the historical posture parameter in the historical parameter set is less than a preset variation threshold; and sending the target data to the server.

For example, the parameter set also includes a sending time of the target data and/or a location identifier of the mobile terminal.

For example, the method further includes receiving the response information sent by the server. The response information is sent by the server to respond to the target data after the server determines that the parameter set does not satisfy the preset condition.

For example, the target data is target transaction data and the historical data is the historical transaction data.

For example, the present disclosure provides a data processing apparatus comprising:

a target data receiving module that receives target data sent by a mobile terminal, the target data carrying a parameter set, the parameter set including at least a target posture parameter of the mobile terminal;

a historical parameter set obtaining module that obtains a historical parameter set in historical data corresponding to the mobile terminal, the historical parameter set including at least a historical posture parameter of the mobile terminal; and a false data determining module that, in response to determining that the parameter set satisfies a preset condition according to the historical parameter set, determines that the target data is false data, the parameter set satisfying the preset condition including at least that a posture variation between the target posture parameter in the parameter set and the historical posture parameter in the historical parameter set is less than a preset variation threshold.

For example, the parameter set also includes a sending time of the target data.

The false data determining module further determines the time interval that the mobile terminal sends data is less than a preset time length. The time interval is determined by the sending time of the target data and the sending time of the historical data in the historical parameter set.

For example, the parameter set also includes a location identifier of the mobile terminal. The false data determining module further determines that the locations of the mobile terminal and the set of historical false terminal are within a preset range according to the location identifier. The set of historical false terminal includes one or more historical false terminals.

For example, the data processing apparatus further includes a blocking module that blocks the false data; and a false terminal determining module that determines the mobile terminal as a false terminal.

For example, the data processing apparatus also includes a response information sending module that, when the parameter set does not satisfy the preset condition, in response to the target data, sends response information to the mobile terminal.

For example, the target data is target transaction data and the historical data is the historical transaction data.

The present disclosure provides another data processing apparatus comprising:

a target data generating module that generates target data, the target data carrying a parameter set, the parameter set including at least a target posture parameter of the mobile terminal, the parameter set being a basis to determine that the target data is false data such that a server obtains a historical parameter set in historical data corresponding to the mobile terminal and, in response to determining that the parameter set satisfies a preset condition according to the historical parameter set, determines that the target data is false data, the historical parameter set including at least a historical posture parameter of the mobile terminal, the parameter set satisfying the preset condition including at least that a posture variation between the target posture parameter in the parameter set and the historical posture parameter in the historical parameter set is less than a preset variation threshold; and a target data sending module that sends the target data to the server.

For example, the data processing apparatus also includes a response information sending module that receives response information sent by the server. The response information is sent by the server to respond to the target data after the server determines that the parameter set does not satisfy the preset condition.

For example, the target data is target transaction data and the historical data is the historical transaction data.

The present disclosure also provides a data processing system including a mobile terminal and a server.

The mobile terminal generates target data and sends the target data to the server.

The server receives the target data sent by the mobile terminal, the target data carrying a parameter set, the parameter set including at least a target posture parameter of the mobile terminal; obtains a historical parameter set in historical data corresponding to the mobile terminal, the historical parameter set including at least a historical posture parameter of the mobile terminal; and in response to determining that the parameter set satisfies a preset condition according to the historical parameter set, determines that the target data is false data, the parameter set satisfying the preset condition including at least that a posture variation between the target posture parameter in the parameter set and the historical posture parameter in the historical parameter set is less than a preset variation threshold.

For example, the target data is target transaction data and the historical data is the historical transaction data.

In the data processing method of the present disclosure, the server receives the target data carrying the parameter set sent by the mobile terminal. The parameter set includes at least a target posture parameter of the mobile terminal. In response to determining that the posture variation between the target posture parameter and the historical posture parameter is less than a preset variation threshold, the server determines that the parameter set satisfies the preset condition and determines the target data as false data.

In this process, the amount of change in posture variation being smaller than the preset variation threshold indicates that the posture that the mobile terminal sends the target data hardly changes compared with the postures that the mobile terminal historically sends the target data to the server. As the posture of the mobile terminal is frequently changed during the process of normal use of the mobile terminal, the target data sent by the mobile terminal without posture change is regarded as false data. Then the mobile terminal that sends the false data is identified, thereby ensuring the fairness and efficiency of data processing.

BRIEF DESCRIPTION OF THE DRAWINGS

In order to more clearly illustrate the technical solutions in the embodiments of the present disclosure, the accompanying drawings briefly described embodiments or the prior art needed to be used in describing the embodiments. Apparently, the drawings in the following description represent only some of embodiments of the present disclosure. Those of ordinary skill in the art, without creative efforts, can derive other drawings from these drawings.

FIG. 4 is a flowchart illustrating another method for determining the time interval according to an example embodiment of the present disclosure;

FIG. 15 is a diagram illustrating a data processing system according to an example embodiment of the present disclosure.

DETAILED DESCRIPTION

In conjunction with the drawings of the present disclosure, the technical solutions in the example embodiments of the present disclosure will be described below. Apparently, the described example embodiments are merely a portion of rather than all of the embodiments of the present disclosure. All other embodiments obtained by one of ordinary skill in the art without using creative efforts are within the scope of protection of the present disclosure.

The present disclosure uses the comparison result or calculation result of the parameter set carried by the mobile terminal when sending the target data and the historical parameter set to determine whether the parameter set satisfies the preset condition, and further determine whether the sent target data is false data, thereby achieving the purpose of identifying whether the mobile terminal sends the false data.

In the present disclosure, the target posture parameter of the mobile terminal is selected as the most important parameter as, in real life, there already exists using a PC by some means to control a plurality of mobile terminals, each mobile terminal using the corresponding account to send false data. Under this scenario, the plurality of mobile terminals is typically placed on a table or fixed to the wall, which is, in most cases, in a stationary state and their postures do not change much. If the posture parameters of the same mobile terminal in the adjacent two or more times when the mobile terminal sends the data to the server have no or little changes, the mobile terminal is regarded as having status change when sending data, which is further deemed as a false terminal sending false data that is controlled by a PC. Thus, the data sent by such mobile terminal is regarded as false data.

Therefore, the present disclosure uses such characteristic to set the target posture parameter as the basis for identification basis. The parameter set includes at least the target posture parameter of the mobile terminal.

Figure 1:
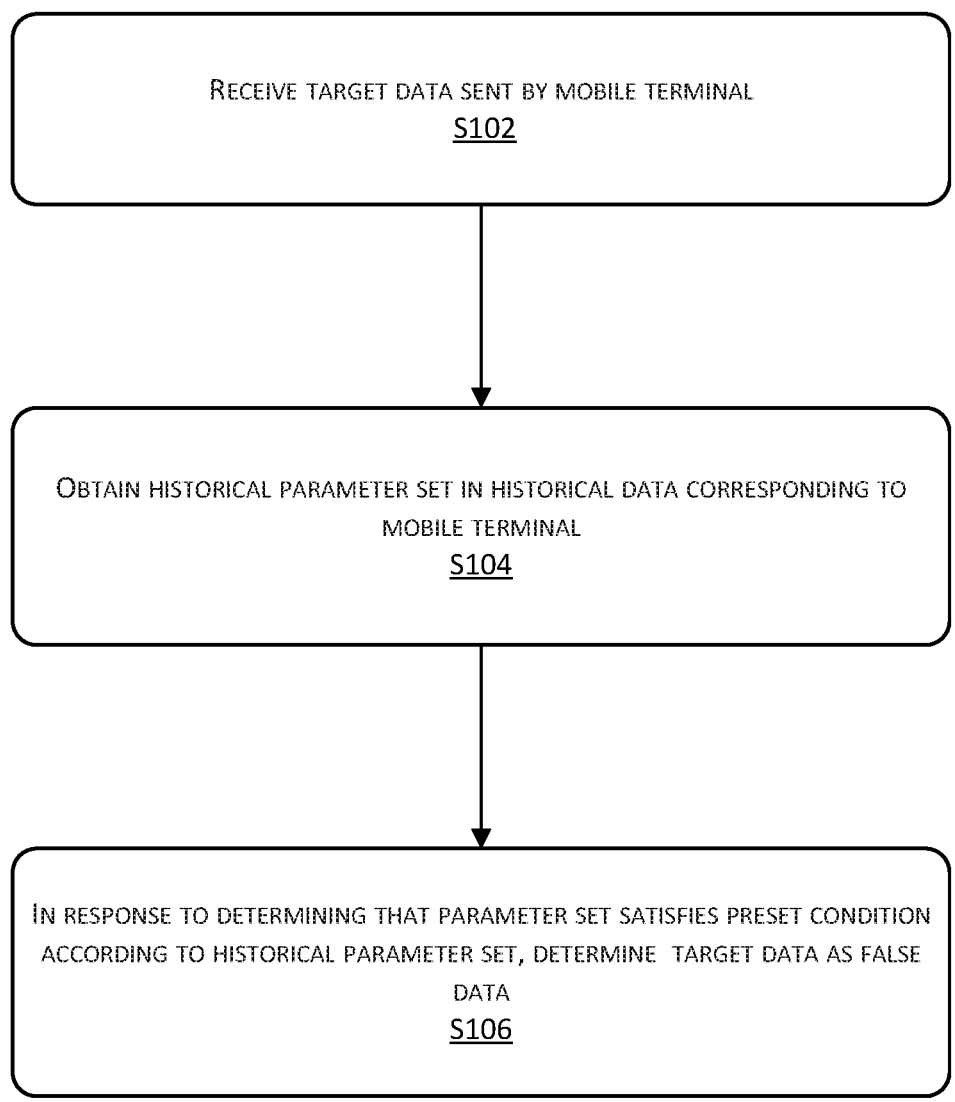
FIG. 1 is a flowchart illustrating a data processing method according to an example embodiment of the present disclosure.

The present disclosure provides a process of a data processing method. Referring to FIG. 1, the data processing method is applied at the server, which includes:

Step S102: the target data sent by the mobile terminal is received.

The target data carries the parameter set. The parameter set includes at least the target posture parameter of the mobile terminal.

Figure 2:
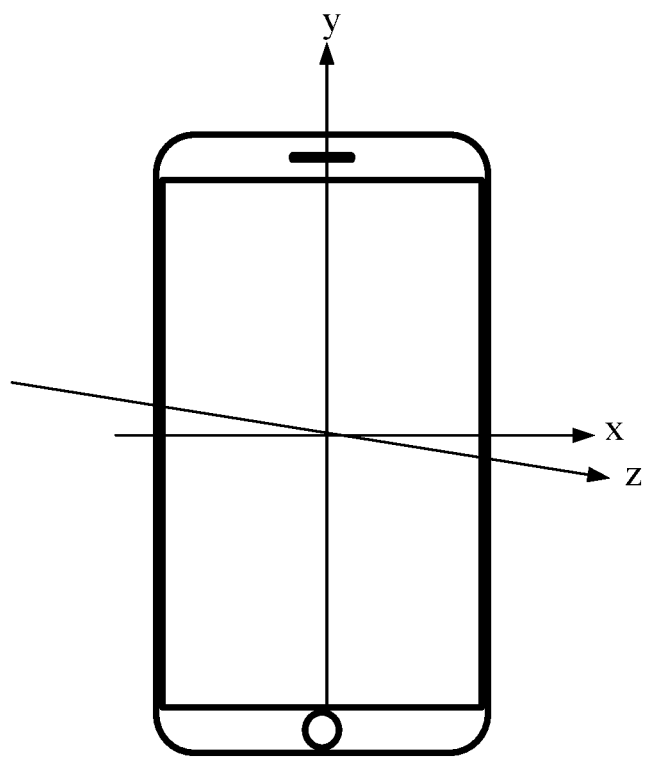
FIG. 2 is a diagram illustrating posture parameters of a mobile terminal according to an example embodiment of the present disclosure.

The target posture parameter refers to a post parameter when the terminal sends the target data. The posture parameter may have multiple forms. For example, the posture parameter may be an angle between the terminal and the horizontal surface, such as 30°. Or, more strictly speaking, the parameter includes an angle $\alpha 1$ between the mobile terminal and the magnetic north, an angle of rotation $\beta 1$ that the mobile terminal is rotated about the horizontal axis X, an angle of rotation $\gamma 1$ that the mobile terminal is rotated about the horizontal axis Z, as shown in FIG. 2.

Step S104: the historical parameter set in historical data corresponding to the mobile terminal is obtained. The historical parameter set includes at least a historical posture parameter of the mobile terminal. The historical data corresponding to the mobile terminal is the data transmitted between the mobile terminal and the server during the data interaction process prior to the time that the mobile terminal sends the target data, and each time such data is transmitted a parameter set is carried. Such parameter set is defined as historical parameter set. The historical parameter set includes at least the historical posture parameter of the mobile terminal. The historical posture parameter in the historical parameter set may include only the last posture parameter when the mobile terminal sends data to the server in the last time, a preset number of posture parameters when the mobile terminal sends data to the server, or all posture parameters when the mobile terminal sends data to the server.

Step S106: In response to determining that the parameter set satisfies a preset condition according to the historical parameter set, the target data is determined as false data.

The process determining whether the parameter set satisfies the preset condition according to the historical parameter set is mainly achieved by analyzing or calculating the same type parameters in the two parameter sets. In this example embodiment, the parameter set includes at least the target posture parameter while the historical parameter set includes at least the historical posture parameter. The parameter set satisfying the preset condition includes at least that a posture variation between the target posture parameter in the parameter set and the historical posture parameter in the historical parameter set is less than a preset variation threshold.

If the posture parameter is an angle between the terminal and the horizontal surface, assuming that the target posture parameter is 30° and the historical posture parameter is 45°, the posture variation is 15°. Here, the present disclosure does not restrict which value is used as a minuend or subtrahend. Thus, the calculation result does not have a positive or negative sign and an absolute value is sued as long as such value reflects a difference between the two. Assuming that the preset variation threshold is 20°, as the posture variation is less than the preset variation threshold, the parameter set satisfies the present threshold and thus the target data is false data.

If the target posture parameter includes an angle $\alpha_1$ between the mobile terminal and the magnetic north, an angle of rotation $\beta_1$ that the mobile terminal is rotated about the horizontal axis X, an angle of rotation $\gamma_1$ that the mobile terminal is rotated about the horizontal axis Z, and the historical posture parameter includes a historical angle $\alpha_2$ between the mobile terminal and the magnetic north, an angle of rotation $\beta_2$ that the mobile terminal is rotated about the horizontal axis X, an angle of rotation $\gamma_2$ that the mobile terminal is rotated about the horizontal axis Z, the calculation result from the angle variation $\Delta$ of the rotation of the three-dimension space $\sqrt{(\alpha-\alpha_2)^2-(\beta-\beta_2)^2-(\gamma-\gamma_2)^2}$ is used as the posture variation. The preset variation threshold may be set as 10°.

The present disclosure does not restrict to use the above formula to calculate the posture variation. For example, the differences between $\alpha_1$ and $\alpha_2$, $\beta_1$ and $\beta_2$, $\gamma_1$ and $\gamma_2$ are calculated and the average value of the three differences is used as the posture variation.

In the data processing method of the present disclosure, the server receives the target data carrying the parameter set sent by the mobile terminal. The parameter set includes at least the target posture parameter when the mobile terminal sends the target data to the server. When the posture variation value between the target posture parameter and the historical posture parameter is less than the preset variation threshold, the posture that the mobile terminal sends the target data this time has almost no change from the posture that the mobile terminal historically sends the target data to the server. As the postures of the mobile terminal in normal use change frequently, the target data sent when the posture of the mobile terminal does not change is regarded as false data and the further the mobile terminal is identified as a false terminal.

Further, the parameter set also includes a sending time of the target data. The parameter set satisfying the preset condition also includes that a time interval that the mobile terminal sends data is less than a predetermined time length. The time interval is determined by the sending time of the target data and the sending time of the historical data in the historical parameter set.

The present techniques calculate the time interval that the mobile terminal sends the data as the determination condition. As criminal frequently controls the mobile terminal to make orders on the electronic business platform, if the time interval is small, the order frequency is higher, which conforms to the characteristic of sending false data. Thus, the present techniques use the time interval that the mobile terminal sends data being less than the preset time length as another determination condition, and use such condition together with the condition that the posture variation is less than the preset variation threshold. When both conditions are met, the parameter set is determined to satisfy the preset condition and thus the target6 data is the false data.

Figure 3:
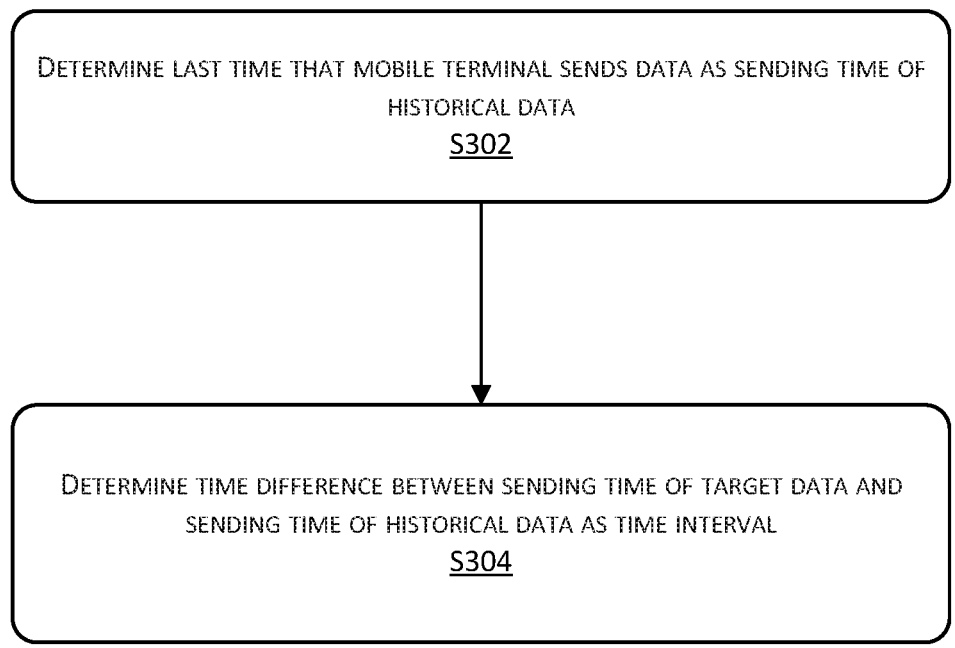
FIG. 3 is a flowchart illustrating a method for determining the time interval according to an example embodiment of the present disclosure.

In the example embodiment, the process of determining the time interval may be as shown in FIG. 3, which includes:

Step S302: the last time that the mobile terminal sends data is determined as the sending time of the historical data.

Suppose the last time that the mobile terminal sends data is t1 and the sending time of the target data is t2.

Step S304: The time difference between the sending time of the target data and the sending time of the historical data is determined as the time interval.

$$\delta T = t2 - t1$$

The present disclosure is not limited to determine the time interval only by the method shown in FIG. 3. The method as shown in FIG. 4 may also be used, which includes:

Step S402: when there are multiple sending times of the historical data, the time intervals of sending times of the adjacent historical data are calculated respectively.

Step S404: the time interval between the sending time of the target data and the last time that the mobile terminal sends data is calculated.

Step S406: the average value of all time intervals is calculated. The average value is used as the time interval that the mobile terminal sends data.

The present disclosure does not restrict to use the above two methods to obtain the time interval. Any method that calculates the time interval value of the frequency that the mobile terminal sends data is with the protection scope of the present disclosure. Compared with the method shown in FIG. 3, the method shown in FIG. 4 uses the average value to determine the time interval, which more accurately reflects the frequency that the mobile terminal sends the data within a period of time.

Based on any of the above example embodiments, the parameter set of the present disclosure may also include a location identifier of the mobile terminal.

The parameter set satisfying the preset condition also includes that the locations of the mobile terminal and the set of historical false terminal are within a preset range according to the location identifier. The set of historical false terminal includes one or more historical false terminals. When the set of historical false terminal includes multiple historical false terminals, the distance between adjacent historical false terminals is less than a preset distance threshold.

The present disclosure uses the location relationship between the mobile terminal and the set of historical false terminal. During the process of using a PC machine to control multiple mobile terminals to send false data, multiple mobile terminals need to be connected with the PC through the control cable or wireless local area network. Thus, the locations of the multiple mobile terminals are close within a short range. Thus, when some historical false terminals are determined and used as the set of historical false terminal, if the locations of the one particular mobile terminals and the historical false terminals in the set of historical false terminal are within a preset range, the locations of the mobile terminal and the historical false terminal are deemed close, and thus the mobile terminal is also deemed as a terminal that sends false data.

In the example embodiment, the location identifier includes latitude and longitude data, a base station identifier, and/or a WIFI hotspot identifier of the mobile terminal when the mobile terminal sends the target data.

Figure 5:
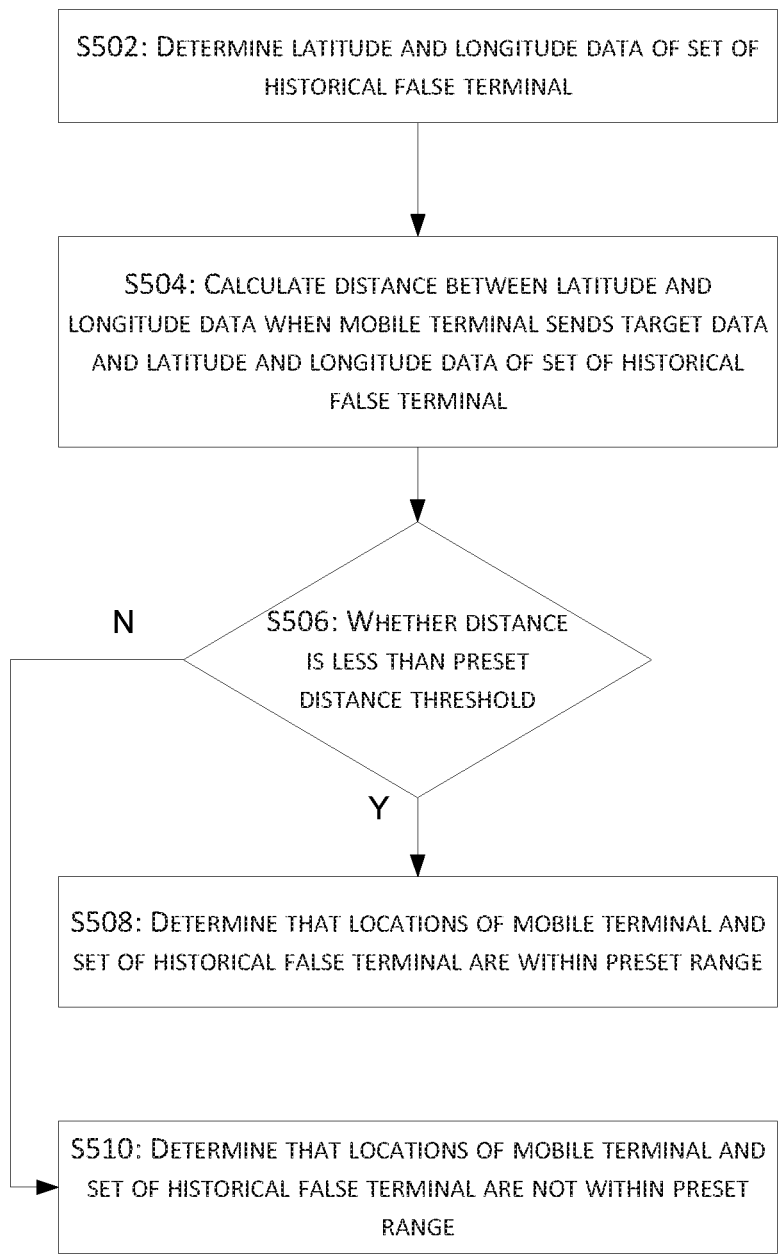
FIG. 5 is a flowchart illustrating a method for determining that the locations of the mobile terminal and the set of historical false terminal are within a preset range according to the location identifier according to an example embodiment of the present disclosure.

When the location identifier is the latitude and longitude data when the terminal sends data, the location identifier included in the historical parameter set includes the latitude and longitude data when the false terminal in the set of historical false terminal sends data. Then, the determining process that the locations of the mobile terminal and the set of historical false terminal are within a preset range according to the location identifier may be as shown in FIG. 5, which includes:

Step S502: the latitude and longitude data of the set of historical false terminal is determined.

Step S504: the difference between the latitude and longitude data when the mobile terminal sends the target data and the latitude and longitude data of the set of historical false terminal is calculated.

Step S506: whether the distance is less than a preset distance threshold is determined. If a result is positive, step S508 is performed; if not, step S510 is performed.

The preset distance threshold may be set to 5 cm, or according to actual situation.

Step S508: the locations of the mobile terminal and the set of historical false terminal are determined within a preset range.

Step S510: the locations of the mobile terminal and the set of historical false terminal are determined not within a preset range.

In this example embodiment, the latitude and longitude data of the set of historical false terminal may be the latitude and longitude data of a predetermined false terminal, or the latitude and longitude data the centers of the shapes covering the various historical false terminals in the set of historical false terminal. Such shape may be circle, square, or other shapes as long as they cover all historical false terminals and their centers are ascertainable, which are within the protection scope of the present disclosure.

Figure 6:
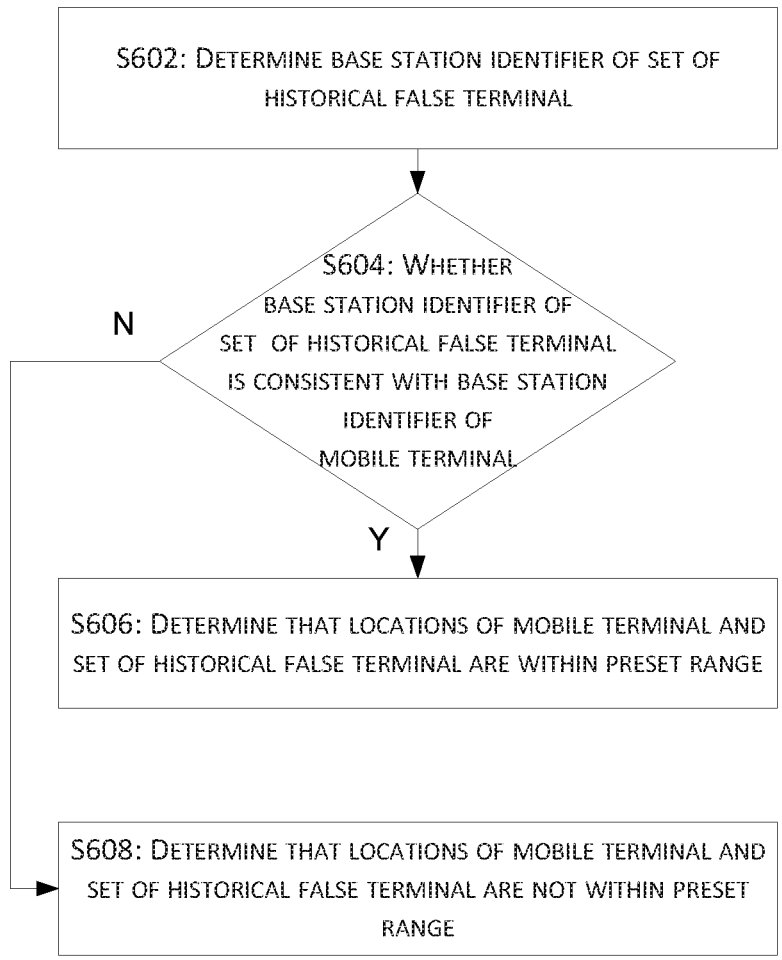
FIG. 6 is a flowchart illustrating another method for determining that the locations of the mobile terminal and the set of historical false terminal are within a preset range according to the location identifier according to an example embodiment of the present disclosure.
Figure 7:
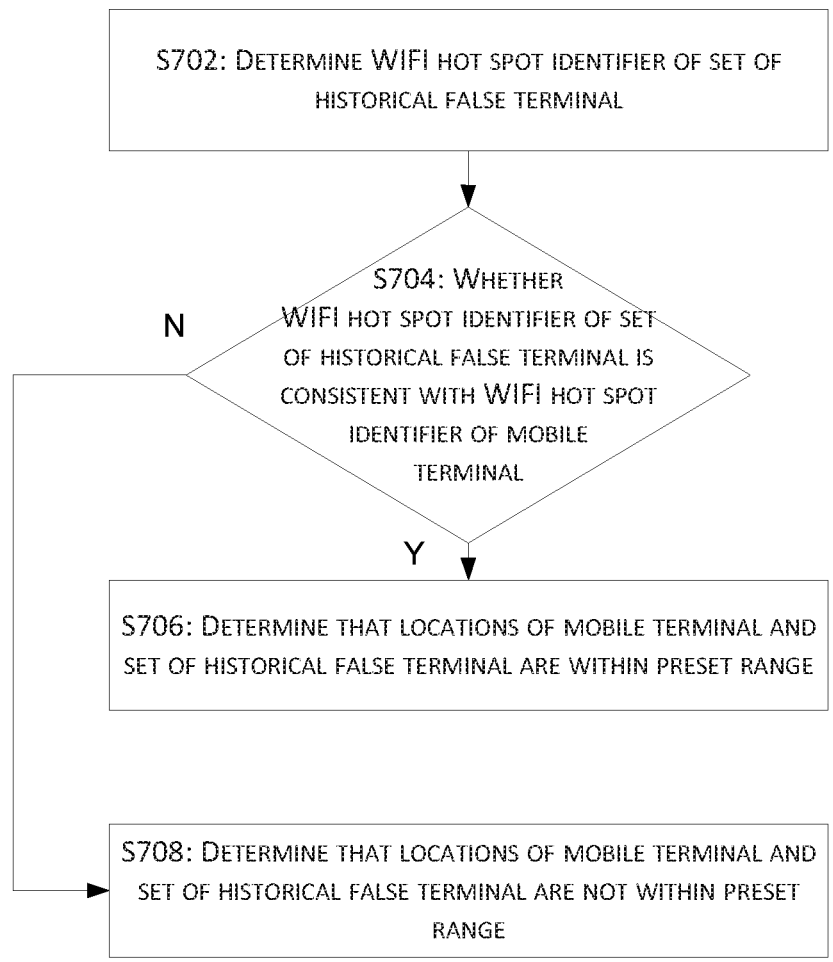
FIG. 7 is a flowchart illustrating another method for determining that the locations of the mobile terminal and the set of historical false terminal are within a preset range according to the location identifier according to an example embodiment of the present disclosure.

When the location identifier is the base station identifier of the base station when the terminal sends data, the location identifier included in the historical parameter set includes the base station identifier of the base station when the false terminal in the set of historical false terminal sends data. Then, the determining process that the locations of the mobile terminal and the set of historical false terminal are within a preset range according to the location identifier may be as shown in FIG. 6, which includes:

Step S602: the base station identifier of the set of historical false terminal is determined.

The base station identifier is CGI.

Step S604: whether the base station identifier of the base station when the mobile terminal sends target data is consistent with the base station identifier of the base station when the set of historical false terminal sends data is determined. If the result is positive, step S606 is performed; otherwise, step S608 is performed.

Step S606: the locations of the mobile terminal and the set of historical false terminal are determined within a preset range.

Step S608: the locations of the mobile terminal and the set of historical false terminal are determined not within a preset range.

When the location identifier is the WIFI hot spot identifier of the WIFI hot spot through which the mobile terminal sends data, the location identifier included in the historical parameter sets includes the WIFI hot spot identifier of the WIFI hot spot through which the false terminal in the set of historical false terminal sends data. Then, the determining process that the locations of the mobile terminal and the set of historical false terminal are within a preset range according to the location identifier may be as shown in FIG. 6, which includes:

Step S702: the WIFI hot spot identifier of the set of historical false terminal is determined.

The WIFI hot spot identifier is the SSID or BSSID.

Step S704: whether the WIFI hot spot identifier of the WIFI hot spot through which the mobile terminal sends target data is consistent with the WIFI hot spot identifier of the WIFI hot spot through which the set of historical false terminal sends data is determined. If a result is positive, step S706 is performed; if not, step S708 is performed.

Step S706: the locations of the mobile terminal and the set of historical false terminal are determined within a preset range.

Step S708: the locations of the mobile terminal and the set of historical false terminal are determined not within a preset range.

Figure 8:
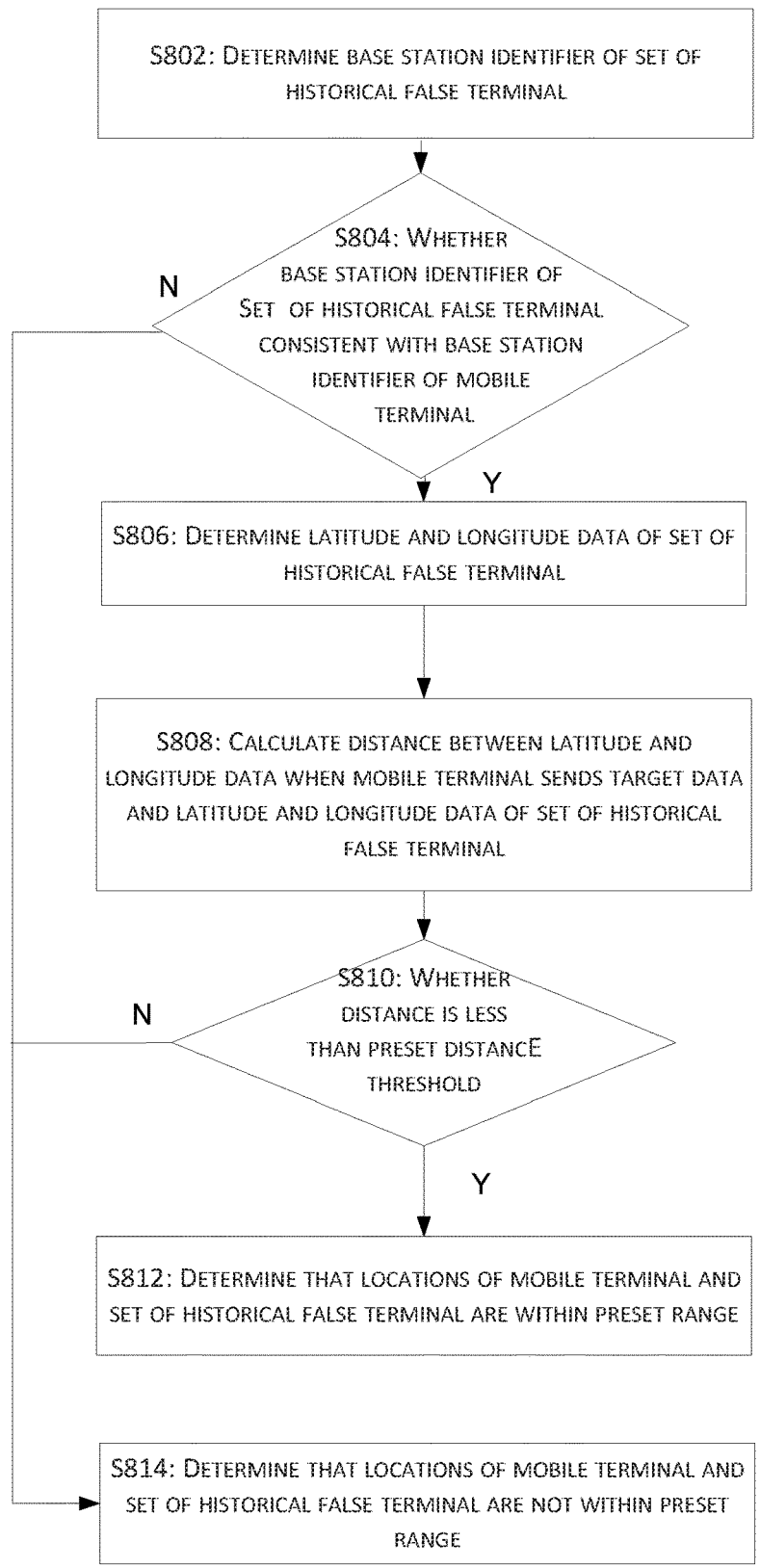
FIG. 8 is a flowchart illustrating another method for determining that the locations of the mobile terminal and the set of historical false terminal are within a preset range according to the location identifier according to an example embodiment of the present disclosure.

The above example embodiment describes from the perspective that the location identifier includes only one form. In an actual application, the location identifier may include a combination of any two or all of the above three forms. Under such situation, the present techniques consider the determination result of the three situations comprehensively when determining whether locations of the mobile terminal and the set of historical false terminal are within the preset range. For example, when the location identifier includes the latitude and longitude data and the base station identifier when the mobile terminal sends the target data, the determination process may be as shown in FIG. 8, which includes:

Step S802: the base station identifier of the set of historical false terminal is determined.

Step S804: whether the base station identifier of the base station through which the mobile terminal sends target data is consistent with the base station identifier of the base station through which the set of historical false terminal sends data is determined. If the result is positive, step S806 is performed; otherwise, step S814 is performed.

Step S806: the latitude and longitude data of the set of historical false terminal is determined.

Step S808: the difference between the latitude and longitude data when the mobile terminal sends the target data and the latitude and longitude data of the set of historical false terminal is calculated.

Step S810: whether the distance is less than a preset distance threshold is determined. If a result is positive, step S812 is performed; if not, step S814 is performed.

Step S812: the locations of the mobile terminal and the set of historical false terminal are determined within a preset range.

Step S814: the locations of the mobile terminal and the set of historical false terminal are determined not within a preset range.

In the example embodiment as shown in FIG. 8, the location identifier includes longitude and latitude data and a base station identifier when the mobile terminal sends the target data. Analysis of these two parameters reveals that the latitude and longitude data is a more direct determination parameter, and the base station identity is a parameter indirectly judged by whether the mobile terminal is in the coverage of the base station. In addition, the coverage of the base station is a large area, and latitude and longitude data is a very specific parameter value. In combination with the characteristics of these two parameters, in the example embodiment as shown in FIG. 8, the present techniques firstly determine whether the base station identifier of the base station when the mobile terminal sends the target data is consistent with the base station identifier of the base station of the set of historical false terminal to determine whether the mobile terminal and the set of historical false terminal are within the coverage of the same base station. If the two are inconsistent, the difference between the two are deemed far away and are directly determined not within the preset range. Thus, there is no need to perform the following calculation process. If the two are consistent, the present techniques further determine whether the distance between the two is within the preset range according to the latitude and longitude data to determine whether the two are in a very close state. That is, the locations of the mobile terminal and the set of historical fake terminal are determined to be within the preset range only when both two determination conditions are satisfied, which improves the accuracy and reliability of the process.

In this example embodiment, the location identifier only includes the longitude and latitude data and the base station identifier of the base station when the mobile terminal sends the target data as an example. The present disclosure does not restrict to perform according to the above process. Two determination conditions may also be determined simultaneously. When the determination result is that the base station identifiers are consistent and the distance is less than the preset distance value, the locations of the mobile terminal and the set of historical false terminal are within a preset range.

When the location identifier includes the latitude and longitude data, the base station identifier, and the WIFI hotspot identifier of the mobile terminal when the mobile terminal sends the target data, the sequence of the three determination processes may also be set according to the actual situation. Or, the sequence of the three determination processes is not limited. The three determination processes may be determined simultaneously. When the base station identifiers are consistent, the WIFI hot spot identifiers are consistent, and the distance is less than the preset distance threshold, the locations of the mobile terminal and the set of historical false terminal are determined to be within the preset range. Or, if any two conditions are met, the locations of the mobile terminal and the set of historical false terminal are determined to be within the preset range. FIG. 8 is just an illustration example and should not be used to restrict the detailed implementation process.

Certainly, the present disclosure does not limit the location identifier to only the above three forms, and may also use location information when the mobile terminal sends the target data by using GPRS.

Figure 9:
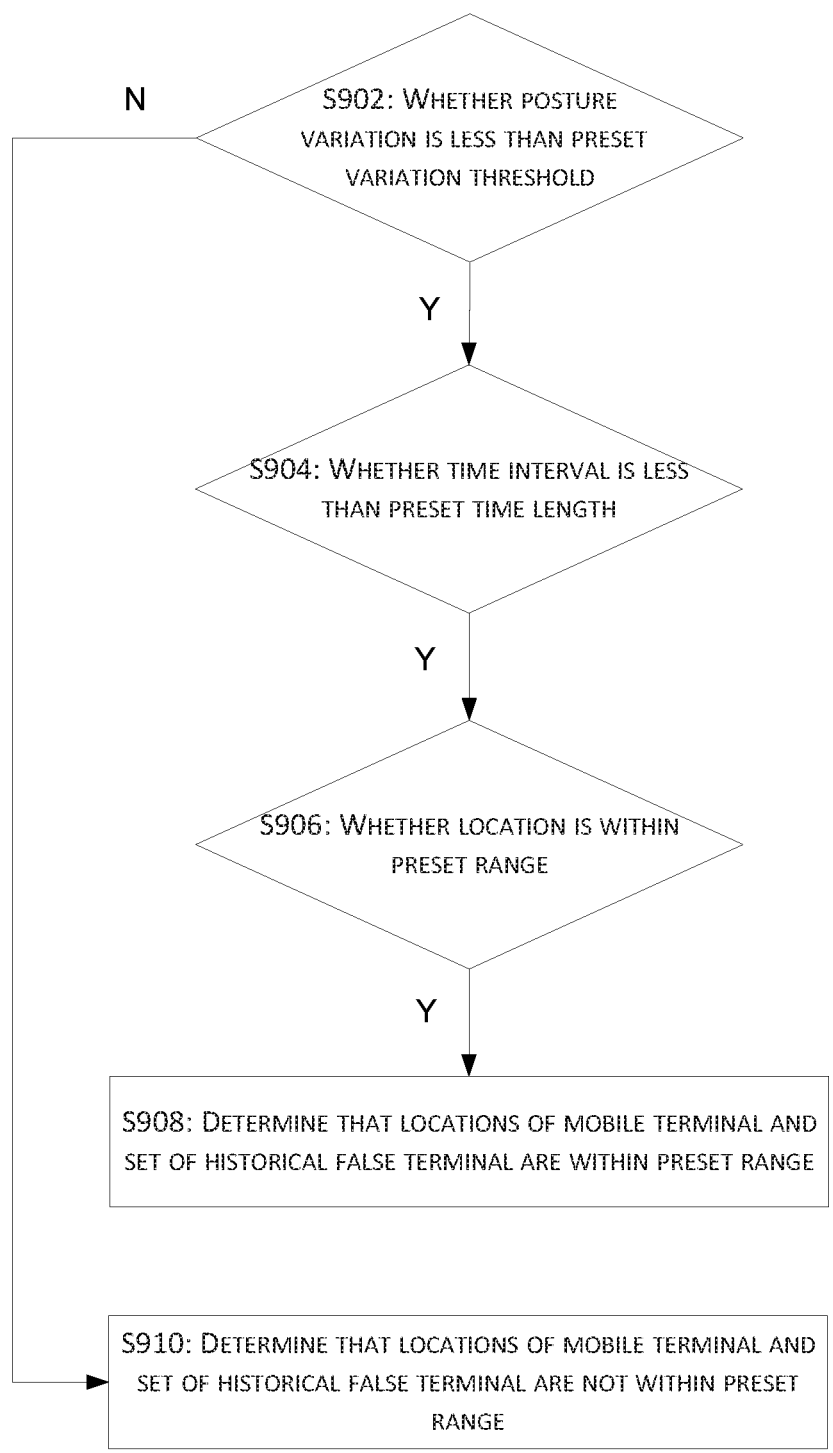
FIG. 9 is a flowchart illustrating a method for determining that the parameter set satisfies the preset condition according to the historical parameter set according to an example embodiment of the present disclosure.

Based on the foregoing example embodiment, the parameter set disclosed by the present disclosure includes the target posture parameter, the sending time of the target data, and/or the location identifier of the mobile terminal. The target posture parameter may be arbitrarily combined with the other two parameters. For example, the parameter set includes the target posture parameter and the sending time of the target data. Alternatively, the parameter includes the target posture parameter, the sending time of the target data, and/or the location identifier of the mobile terminal. Alternatively, the parameter set includes the target posture parameter and the location identifier of the mobile terminal. When the parameter set includes different contents, the process of determining that the parameter set satisfies the preset condition according to the historical parameter set is also different. In this example embodiment, the parameter set includes the target posture parameter, the sending time of the target data, and the location identifier of the mobile terminal, which is used as an example to illustrate the process. The specific process may be as shown in FIG. 9, which includes:

Step S902: whether the posture variance between the target posture parameter and the historical posture parameter in the historical parameter set is less than the preset variation threshold. If a result is positive, step S904 is performed; otherwise, step S910 is performed.

The historical posture parameter includes an angle between the terminal and the horizontal surface, such as 30°, or more strictly speaking, an angle α1 between the mobile terminal and the magnetic north, an angle of rotation β1 that the mobile terminal is rotated about the horizontal axis X, an angle of rotation γ1 that the mobile terminal is rotated about the horizontal axis Z.

Step S904: whether the time interval that the mobile terminal sends data is less than the preset time length is determined. If a result is positive, step S906 is performed; otherwise, step S910 is performed.

Such process may refer to the example embodiment as shown in FIG. 2 or FIG. 3.

Step S906: whether the locations of the mobile terminal and the set of historical false terminal are within the preset range is determined. If a result is positive, step S908 is performed; otherwise, step S910 is performed.

Such step may refer to the example embodiments as shown from FIGS. 3-7.

Step S908: the parameter set satisfies the preset condition.

Step S910: the parameter set does not satisfy the preset condition.

Similarly, the present disclosure only uses the parameter set that includes the posture parameter set, the sending time of the target data, and the location identifier of the mobile terminal as an example to illustrate to process determining that the parameter set satisfies the preset condition according to the historical parameter set, and does not limit to use the above method to implement the process determining that the parameter set satisfies the preset condition according to the historical parameter set. The sequence of the determination process of the three parameters is not determined. The three parameters may be determined simultaneously. When all of the parameters satisfy condition, or two or one parameter satisfies condition, the parameter set is determined to satisfy the preset condition.

In addition, the present disclosure does not limit that the parameter set only includes the above three parameters. The parameter set may also include the merchant identification or the product identification in the target data. The present techniques determine whether the occurrence times of the merchant identification or the product identification are more than the preset number threshold. In a false process, the same merchant or product may be repeatedly visited or purchased for multiple time. When the occurrence times of the merchant identification or the product identification in the target data are more than the preset number threshold, such data is determined as false data.

Figure 10:
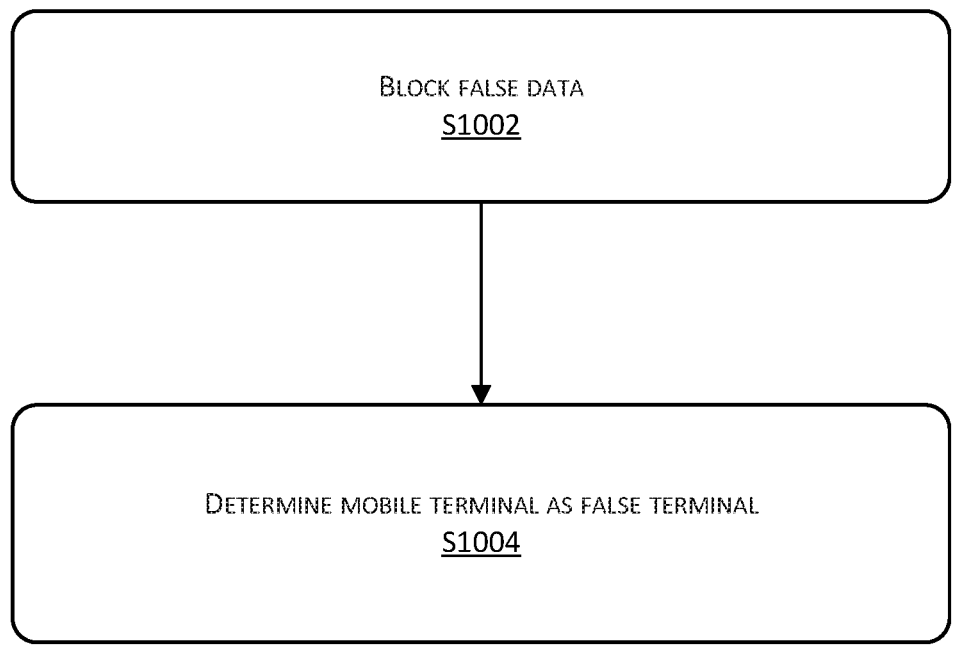
FIG. 10 is a flowchart illustrating another data processing method according to an example embodiment of the present disclosure.

In the above method disclosed by the present disclosure, after the target data is determined as false data, the method also includes the following processing process, as shown in FIG. 10, which includes:

Step S1002: the false data is blocked.

The false data may be blocked, not processed, or deleted.

Step S1004: the false terminal is determined as the false terminal.

The mobile terminal sending the false data is defined as the false terminal so that when the data sent by the false terminal is received again, such data is directly determined as the false data. Alternatively, such terminal is added into the set of historical false terminal to help identify false data in the following data processing.

After the parameter set is determined as not satisfying the preset condition, in response to the target data, the response information is sent to the mobile terminal.

Figure 11:
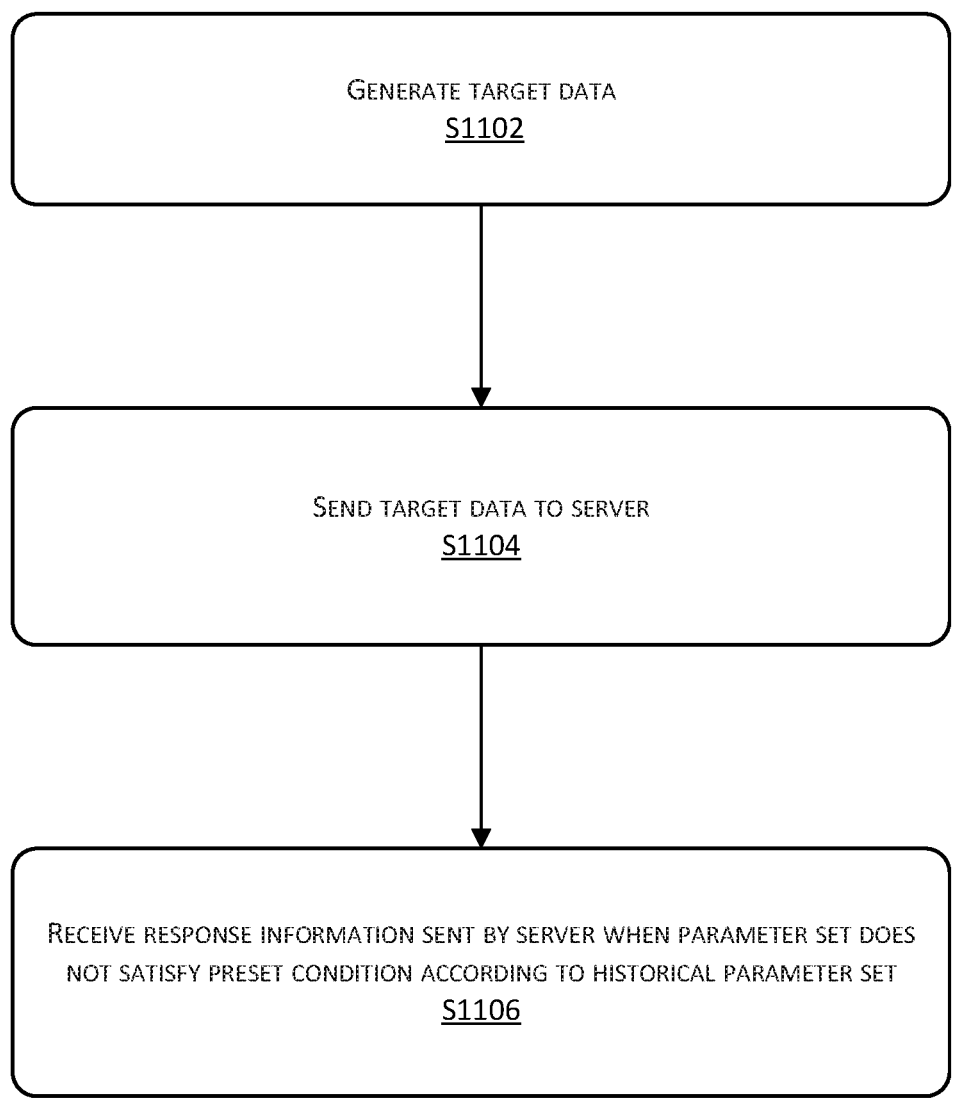
FIG. 11 is a flowchart illustrating another data processing method according to an example embodiment of the present disclosure.

The present disclosure also provides a data processing method applied at the mobile terminal corresponding to the above data processing method, as shown in FIG. 11, which includes:

Step S1102: the target data is generated.

The target data carries a parameter set. The parameter set includes at least a target posture parameter of the mobile terminal. The parameter set is a basis to determine that the target data is false data such that a server obtains a historical parameter set in historical data corresponding to the mobile terminal and, in response to determining that the parameter set satisfies a preset condition according to the historical parameter set, determines that the target data is false data. The historical parameter set includes at least a historical posture parameter of the mobile terminal. The parameter set satisfying the preset condition includes at least that a posture variation between the target posture parameter in the parameter set and the historical posture parameter in the historical parameter set is less than a preset variation threshold.

In addition, the parameter set also includes a sending time of the target data and/or a location identifier of the mobile terminal. The parameter set may also include the merchant identification and/or product identification in the target data. The present techniques determine whether the occurrence times of the merchant identification or the product identification are more than the preset number threshold.

The location identifier includes, but is not limited to, the longitude and latitude data, the base station identifier of the base station, and the WIFI hot spot identification of the WIFI hot spot when the mobile terminal sends the target data.

Certainly, the present disclosure does not limit the location identifier to only the above three forms, and may also use the location information when the mobile terminal sends the target data by using GPRS.

Step S1104: the target data is sent to the server.

In the data processing method of the present disclosure, the mobile terminal sends the parameter set together with the target data. The parameter set includes at least the target posture parameter when the mobile terminal sends the target data to the server so that the server determines that the target data is false data by using the parameter set.

Further, the method also includes:

Step S1106: the response information sent by the server is received when the parameter set does not satisfy the preset condition according to the historical parameter set.

In the example embodiments as shown from FIGS. 1-11, the target data may be target transaction data. The historical data may be historical transaction data. That is, when the mobile terminal conducts transactions with the server, the server determines whether the transaction data sent by the mobile terminal is false transaction data.

Figure 12:
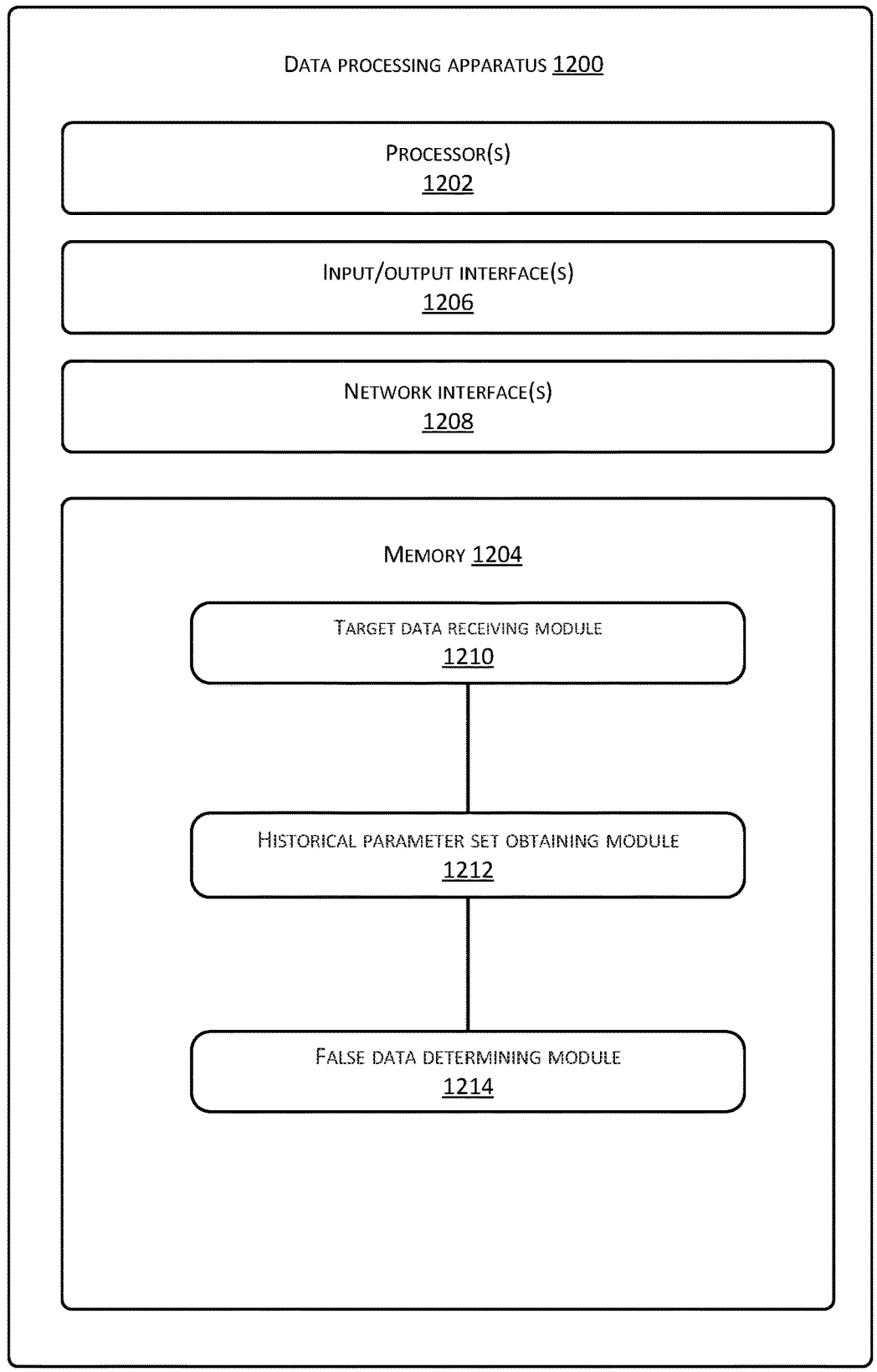
FIG. 12 is a diagram illustrating a data processing apparatus according to an example embodiment of the present disclosure.

The present disclosure provides a data processing apparatus 1200 whose structure as shown in FIG. 12.

The data processing apparatus 1200 includes one or more processor(s) 1202 or data processing unit(s) and memory 1204. The data processing apparatus 1200 may further include one or more input/output interface(s) 1206 and one or more network interface(s) 1208. The memory 1204 is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include non-transitory transitory media such as modulated data signals and carriers.

The memory 1204 may store therein a plurality of modules or units including a target data receiving module 1210, a historical parameter set obtaining module 1212, and a false data determining module 1214.

The target data receiving module 1210 receives target data sent by a mobile terminal, the target data carrying a parameter set, the parameter set including at least a target posture parameter of the mobile terminal.

The target posture parameter refers to a post parameter when the terminal sends the target data. The posture parameter may have multiple forms. For example, the posture parameter may be an angle between the terminal and the horizontal surface, such as 30°. Or, more strictly speaking, the parameter includes an angle $\alpha 1$ between the mobile terminal and the magnetic north, an angle of rotation $\beta 1$ that the mobile terminal is rotated about the horizontal axis X, an angle of rotation $\gamma 1$ that the mobile terminal is rotated about the horizontal axis Z, as shown in FIG. 2.

If the posture parameter is an angle between the terminal and the horizontal surface, assuming that the target posture parameter is 30° and the historical posture parameter is 45°, the posture variation is 15°. Here, the present disclosure does not restrict which value is used as a minuend or subtrahend. Thus, the calculation result does not have a positive or negative sign and an absolute value is sued as long as such value reflects a difference between the two. Assuming that the preset variation threshold is 20°, as the posture variation is less than the preset variation threshold, the parameter set satisfies the present threshold and thus the target data is false data.

If the target posture parameter includes an angle $\alpha_1$ between the mobile terminal and the magnetic north, an angle of rotation $\beta_1$ that the mobile terminal is rotated about the horizontal axis X, an angle of rotation $\gamma_1$ that the mobile terminal is rotated about the horizontal axis Z, and the historical posture parameter includes a historical angle $\alpha_2$ between the mobile terminal and the magnetic north, an angle of rotation $\beta_2$ that the mobile terminal is rotated about the horizontal axis X, an angle of rotation $\gamma_2$ that the mobile terminal is rotated about the horizontal axis Z, the calculation result from the angle variation $\Delta$ of the rotation of the three dimension space $\sqrt{(\alpha-\alpha_2)^2-(\beta-\beta_2)^2-(\gamma-\gamma_2)^2}$ is used as the posture variation. The preset variation threshold may be set as 10°.

The present disclosure does not restrict to use the above formula to calculate the posture variation. For example, the differences between $\alpha_1$ and $\alpha_2$, $\beta_1$ and $\beta_2$, $\gamma_1$ and $\gamma_2$ are calculated and the average value of the three differences is used as the posture variation.

The historical parameter set obtaining module 1212 obtains a historical parameter set in historical data corresponding to the mobile terminal, the historical parameter set including at least a historical posture parameter of the mobile terminal.

The historical data corresponding to the mobile terminal is the data transmitted between the mobile terminal and the server during the data interaction process prior to the time that the mobile terminal sends the target data, and each time such data is transmitted a parameter set is carried. Such parameter set is defined as historical parameter set. The historical parameter set includes at least the historical posture parameter of the mobile terminal. The historical posture parameter in the historical parameter set may include only the last posture parameter when the mobile terminal sends data to the server in the last time, a preset number of posture parameters when the mobile terminal sends data to the server, or all posture parameters when the mobile terminal sends data to the server.

The false data determining module 1214, in response to determining that the parameter set satisfies a preset condition according to the historical parameter set, determines that the target data is false data, the parameter set satisfying the preset condition including at least that a posture variation between the target posture parameter in the parameter set and the historical posture parameter in the historical parameter set is less than a preset variation threshold.

The parameter set may also include a sending time of the target data.

The false data determining module 1214 further determines the time interval that the mobile terminal sends data is less than a preset time length. The time interval is determined by the sending time of the target data and the sending time of the historical data in the historical parameter set.

The last time that the mobile terminal sends data may be determined as the sending time of the historical data. Suppose the last time that the mobile terminal sends data is t1 and the sending time of the target data is t2, the time difference between the sending time of the target data and the sending time of the historical data is determined as the time interval.

Alternatively, when there are multiple sending times of the historical data, the time intervals of adjacent sending times of the historical data are calculated respectively. The time interval between the sending time of the target data and the last time that the mobile terminal sends data is calculated. The average value of all time intervals is calculated. The average value is used as the time interval that the mobile terminal sends data.

Based on the foregoing example embodiment, the parameter set may also include the location identifier of the mobile terminal.

The false data determining module 1214 further determines whether the locations of the mobile terminal and set of historical false terminal are within the preset range. The set of historical false terminal includes one or more historical false terminals.

In the example embodiment, the location identifier includes latitude and longitude data, a base station identifier, and/or a WIFI hotspot identifier of the mobile terminal when the mobile terminal sends the target data.

The determining process that the locations of the mobile terminal and the set of historical false terminal are within a preset range according to the location identifier includes:

determining latitude and longitude data of the set of historical false terminal; calculating a distance between the latitude and longitude data of the mobile terminal that sends the target data and the latitude and longitude data of the set of historical false terminal; in response to determining that the distance is less than a preset distance threshold, determining that the locations of the mobile terminal and the set of historical false terminal are within the preset range;

determining the base station identifier of the set of historical false terminal; in response to determining that the base station identifier of the base station that the mobile terminal uses to send the target data coincides with the base station identifier of the set of historical false terminal, determining that the locations of the mobile terminal and the set of historical false terminal are within the preset range; or determining a WIFI hot spot identifier of the set of historical false terminal; in response to determining that the WIFI hot spot identifier of the WIFI hot spot that the mobile terminal uses to send the target data coincides with the WIFI hot spot of the set of historical false terminal, determining that the locations of the mobile terminal and the set of historical false terminal are within the preset range.

The detailed process may refer to the example embodiments as shown in FIGS. 3-7.

Alternatively, any of the above two or three determination processes may be combined to set the sequence of determination processes to determine subsequently to obtain the result. Alternatively, the sequence of the determination processes is not limited and the determination processes may be conducted simultaneously. When the base station identifiers of the mobile terminal and the set of historical false terminal are consistent, the WIFI hot spot identifiers of the mobile terminal and the set of historical false terminal are consistent, and the distance between the mobile terminal and the set of historical false terminal is less than the preset distance threshold, the locations of the mobile terminal and the set of historical false terminal are within the present range. Or if any two of the conditions are satisfied, the locations of the mobile terminal and the set of historical false terminal are within the present range.

As shown from the above example embodiments, the parameter set disclosed by the present disclosure includes the target posture parameter, the sending time of the target data, and/or the location identifier of the mobile terminal. The target posture parameter may be arbitrarily combined with the other two parameters. For example, the parameter set includes the target posture parameter and the sending time of the target data. Alternatively, the parameter set includes the target posture parameter, the sending time of the target data, and the location identifier of the mobile terminal. Alternatively, the parameter set includes the target posture parameter and the location identifier of the mobile terminal. When the contents included in the parameter set are different, the process determining that the parameter set satisfies the preset condition according to the historical parameter set is also different, which may refer to the process as shown in FIG. 9.

Figure 13:
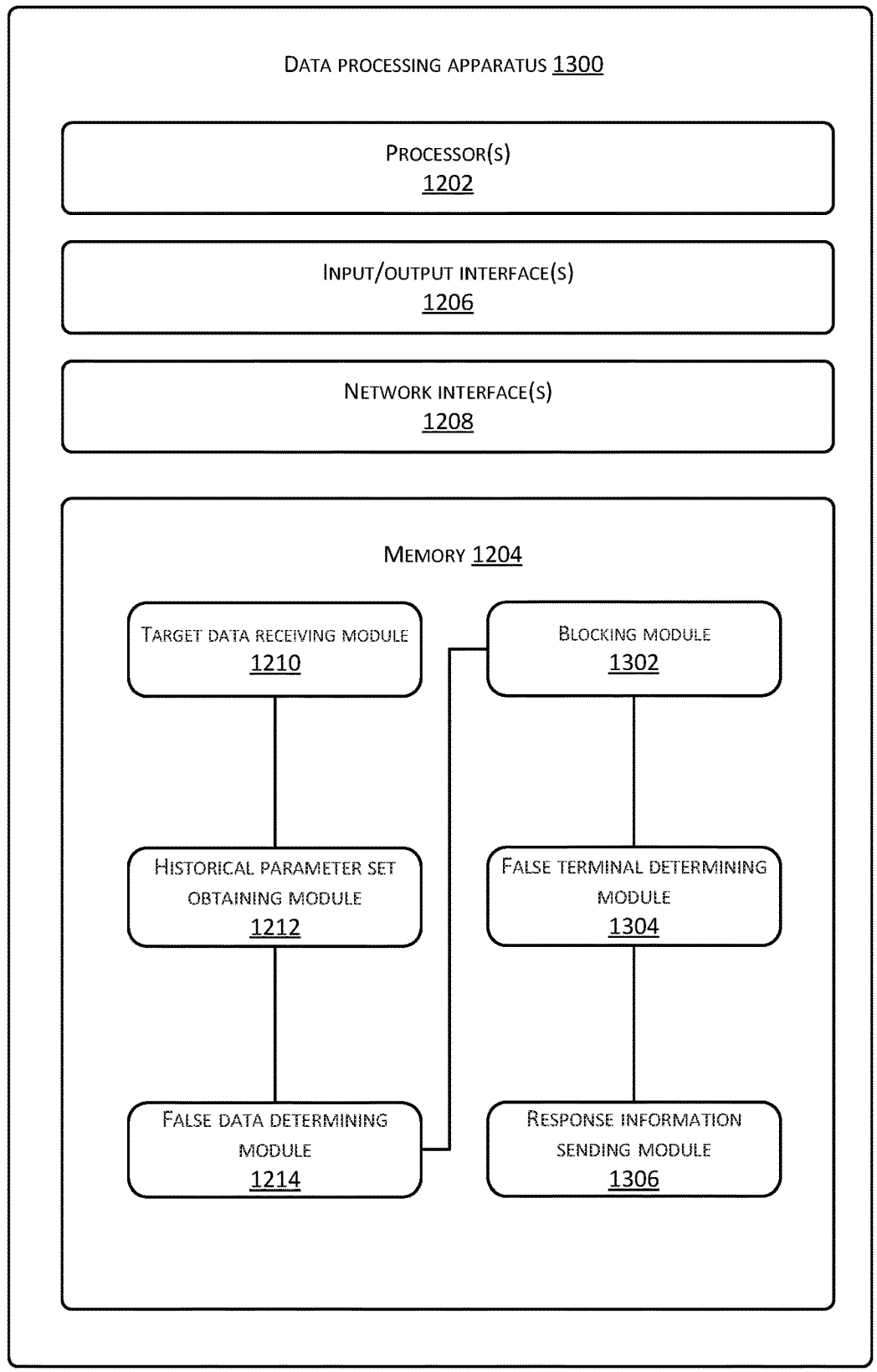
FIG. 13 is a diagram illustrating another data processing apparatus according to an example embodiment of the present disclosure.

Further, the structure of a data processing apparatus 1300 may be as shown in FIG. 13. In addition to the modules as shown in FIG. 12, the data processing apparatus 1300 as shown in FIG. 13 may further includes the following modules stored on memory 1204:

a blocking module 1302 that blocks the false data;

a false terminal determining module 1304 that determines the mobile terminal as a false terminal; and a response information sending module 1306 that, when the parameter set does not satisfy the preset condition, in response to the target data, sends response information to the mobile terminal.

The data processing apparatus disclosed by the present disclosure applies at the server, which receives the target data carrying the parameter set sent by the mobile terminal. The parameter set includes at least the target posture parameter when the mobile terminal sends the target data to the server. When the posture variation value between the target posture parameter and the historical posture parameter is less than the preset variation threshold, the posture that the mobile terminal sends the target data this time has almost no change from the posture that the mobile terminal historically sends the target data to the server. As the postures of the mobile terminal in normal use change frequently, the target data sent when the posture of the mobile terminal does not change is regarded as false data.

Figure 14:
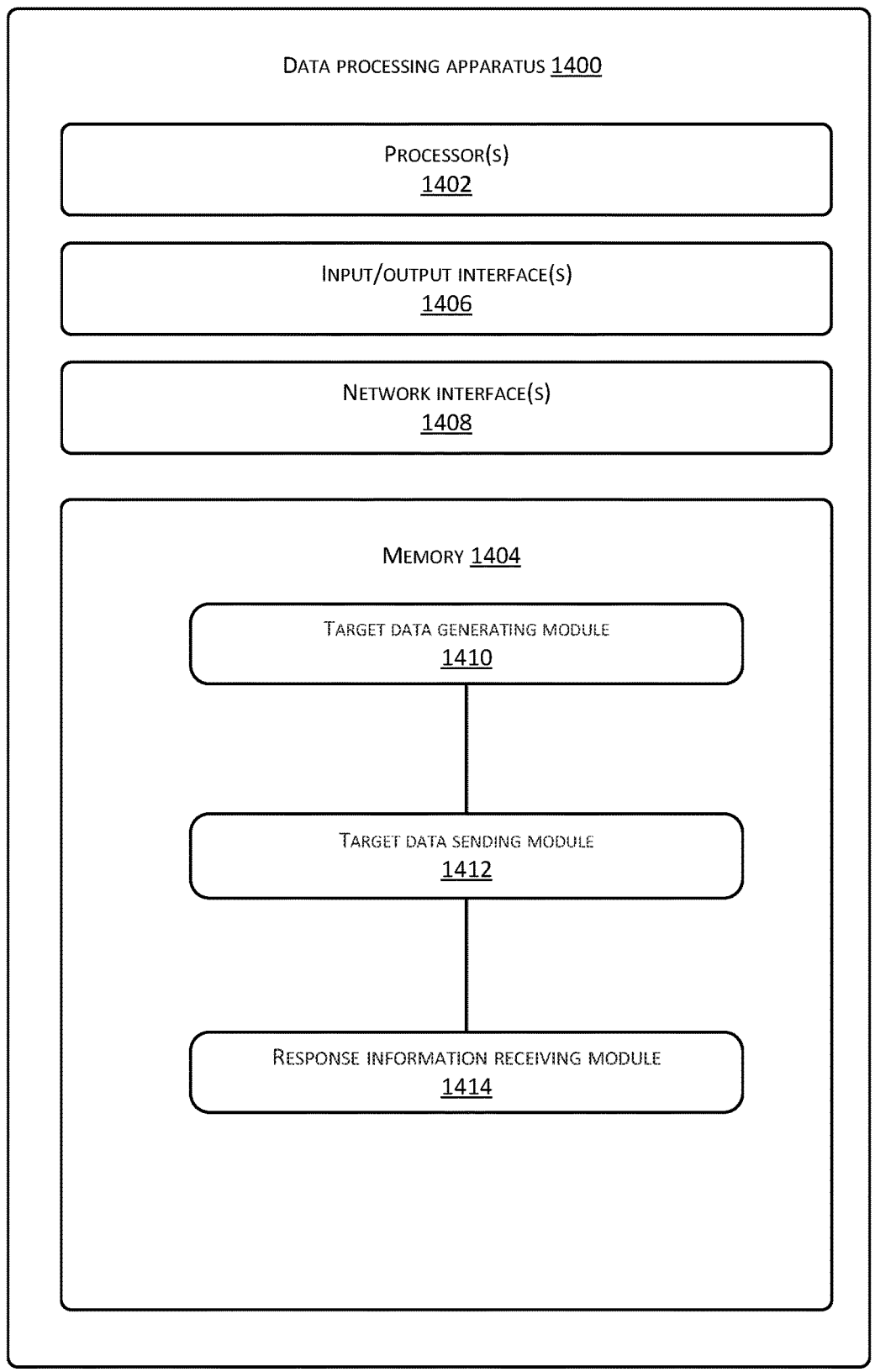
FIG. 14 is a diagram illustrating another data processing apparatus according to an example embodiment of the present disclosure.

Correspondingly, the present disclosure provides a data processing apparatus 1400 applied at the mobile terminal, whose structure may be as shown in FIG. 14.

The data processing apparatus 1400 includes one or more processor(s) 1402 or data processing unit(s) and memory 1404. The data processing apparatus 1400 may further include one or more input/output interface(s) 1406 and one or more network interface(s) 1408. The memory 1404 is an example of computer readable media.

The memory 1404 may store therein a plurality of modules or units including a target data generating module 1410 and a target data sending module 1412.

The target data generating module 1410 generates target data, the target data carrying a parameter set, the parameter set including at least a target posture parameter of the mobile terminal, the parameter set being a basis to determine that the target data is false data such that a server obtains a historical parameter set in historical data corresponding to the mobile terminal and, in response to determining that the parameter set satisfies a preset condition according to the historical parameter set, determines that the target data is false data, the historical parameter set including at least a historical posture parameter of the mobile terminal, the parameter set satisfying the preset condition including at least that a posture variation between the target posture parameter in the parameter set and the historical posture parameter in the historical parameter set is less than a preset variation threshold.

The target data sending module 1412 sends the target data to the server.

Further, the data processing apparatus 1400 may also include a response information receiving module 1414 stored on memory 1404 that receives response information sent by the server. The response information is sent by the server to respond to the target data after the server determines that the parameter set does not satisfy the preset condition.

The data processing apparatus at the mobile terminal may cooperate with the data processing apparatus at the server to achieve the purpose of identifying false data.

In the example embodiments as shown in FIGS. 12-14, the target data may be target transaction data. The historical data may be historical transaction data. That is, when the mobile terminal conducts transactions with the server, the server determines whether the transaction data sent by the mobile terminal is false transaction data.

The present disclosure also provides a data processing system. As shown in FIG. 15, the data processing process includes the mobile terminal 1502 and the server 1504.

The mobile terminal 1502 generates target data and sends the target data to the server. The mobile terminal may be a cell phone, a tablet. This example embodiment uses the cell phone as an example.

The server 1504 receives the target data sent by the mobile terminal, the target data carrying a parameter set, the parameter set including at least a target posture parameter of the mobile terminal; obtains a historical parameter set in historical data corresponding to the mobile terminal, the historical parameter set including at least a historical posture parameter of the mobile terminal; and in response to determining that the parameter set satisfies a preset condition according to the historical parameter set, determines that the target data is false data. The parameter set satisfying the preset condition includes at least that a posture variation between the target posture parameter in the parameter set and the historical posture parameter in the historical parameter set is less than a preset variation threshold. The operation process of the data processing system may refer to the above method embodiments.

In the data processing system provided by the present disclosure, the mobile terminal sends the parameter set together with the target data so that the server uses the historical parameter set in the historical data to determine whether the parameter set satisfies the preset condition. When the parameter set satisfies the preset condition, the target data is determined as false data, thereby ensuring the fairness and effectiveness of the data processing process.

In the example embodiment as shown in FIG. 15, the target data may be target transaction data. The historical data may be historical transaction data. That is, when the mobile terminal conducts transactions with the server, the server determines whether the transaction data sent by the mobile terminal is false transaction data.

The functions described in the methods of the example embodiments may be stored in a computing device readable storage medium if implemented in the form of a software functional unit and sold or used as an independent product. Based on such understanding, the part of the example embodiments of the present disclosure that makes contributions to the conventional techniques or the part of the technical solution may be embodied in the form of a software product stored in a storage medium and including several instructions for causing a computing device (which may be a personal computer, a server, a mobile computing device, or a network device) to perform all or part of the steps of the method described in each embodiment of the present disclosure. The foregoing storage medium includes various media capable of storing program code such as a USB flash disk, a removable hard disk, a read-only memory (ROM), a random-access memory (RAM), a magnetic disk, or an optical disk.

The example embodiments in the present disclosure are described in a progressive manner. Each embodiment focuses on differences from other embodiments, and the same or similar parts among the embodiments may refer to each other.

The above description of the disclosed example embodiments enables those skilled in the art to make or use the present disclosure. Various modifications to these example embodiments will be readily apparent to those skilled in the art, and the generic principles defined herein may be embodied in other embodiments without departing from the spirit or scope of the present disclosure. Therefore, the present disclosure is not limited to these example embodiments shown herein, but rather should cover the broadest scope consistent with the principles and novel features disclosed herein.

The present disclosure may further be understood with clauses as follows.

Clause 1. A data processing method comprising:
receiving target data sent by a mobile terminal, the target data carrying a parameter set, the parameter set including at least a target posture parameter of the mobile terminal;
obtaining a historical parameter set in historical data corresponding to the mobile terminal, the historical parameter set including at least a historical posture parameter of the mobile terminal; and
in response to determining that the parameter set satisfies a preset condition according to the historical parameter set, determining that the target data is false data, the parameter set satisfying the preset condition including at least that a posture variation between the target posture parameter in the parameter set and the historical posture parameter in the historical parameter set is less than a preset variation threshold.

Clause 2. The method of clause 1, wherein:
the target posture parameter includes:
an angle $\alpha_1$ between the mobile terminal and a magnetic north;
an angle of rotation $\beta_1$ that the mobile terminal is rotated about a horizontal axis X; and
an angle of rotation $\gamma_1$ that the mobile terminal is rotated about a horizontal axis Z; the historical posture parameter includes:
a historical angle $\alpha_2$ between the mobile terminal and the magnetic north;
an angle of rotation $\beta_2$ that the mobile terminal is rotated about the horizontal axis X; and
an angle of rotation $\gamma_2$ that the mobile terminal is rotated about the horizontal axis Z; and
the posture variation between the target posture parameter in the parameter set and the historical posture parameter in the historical parameter set is determined by using a value calculated from a formula $\sqrt{(\alpha-\alpha_2)^2-(\beta-\beta_2)^2-(\gamma-\gamma_2)^2}$.

Clause 3. The method of clause 1, wherein:
the parameter set further includes a sending time of the target data; and
the parameter set satisfying the preset condition further includes that a time interval that the mobile terminal sends data is less than a predetermined time length, the time interval being determined by the sending time of the target data and a sending time of historical data in the historical parameter set.

Clause 4. The method of clause 3, wherein a process to determine the time interval includes:
using a latest time that the mobile terminal sends data as the sending time of the historical data; and
determining a time difference between the sending time of the target data and the sending time of the historical data as the time interval.

Clause 5. The method of clause 1 or 3, wherein:
the parameter set further includes a location identifier of the mobile terminal; and the parameter set satisfying the preset condition further includes that locations of the mobile terminal and a set of historical false terminal are within a preset range according to the location identifier, the set of historical false terminal including one or more historical false terminals.

Clause 6. The method of clause 5, wherein:
when the set of historical false terminal includes multiple historical false terminals, a distance between adjacent historical false terminals is less than a preset distance threshold.

Clause 7. The method of clause 6, wherein:
the location identifier includes latitude and longitude data, a base station identifier, and/or a WIFI hotspot identifier of the mobile terminal when the mobile terminal sends the target data; and
a process determining that locations of the mobile terminal and the set of historical false terminal are within the preset range according to the location identifier includes:
  determining latitude and longitude data of the set of historical false terminal; calculating a distance between the latitude and longitude data of the mobile terminal that sends the target data and the latitude and longitude data of the set of historical false terminal; in response to determining that the distance is less than a preset distance threshold, determining that the locations of the mobile terminal and the set of historical false terminal are within the preset range;
  determining the base station identifier of the set of historical false terminal; in response to determining that the base station identifier of the base station that the mobile terminal uses to send the target data coincides with the base station identifier of the set of historical false terminal, determining that the locations of the mobile terminal and the set of historical false terminal are within the preset range; or
  determining a WIFI hot spot identifier of the set of historical false terminal; in response to determining that the WIFI hot spot identifier of the WIFI hot spot that the mobile terminal uses to send the target data coincides with the WIFI hot spot of the set of historical false terminal, determining that the locations of the mobile terminal and the set of historical false terminal are within the preset range.

Clause 8. The method of clause 7, wherein the latitude and longitude data of the set of historical false terminal includes latitude and longitude data of center points of shapes of various historical false terminals in the set of historical false terminal.

Clause 9. The method of clause 7, wherein:
the base station identifier is a Cell Global Identifier (CGI); and
the WIFI hotspot identifier is a service set identifier (SSID) or a basic service set identification (BS SID).

Clause 10. The method of clause 1, further comprising:
after, in response to determining that the parameter set satisfies the preset condition according to the historical parameter set, determining that the target data is false data,
blocking the false data; and
determining that the mobile terminal is a false terminal.

Clause 11. The method of clause 1, further comprising:
in response to determining that the parameter set does not satisfy the preset condition, in response to the target data, sending response information to the mobile terminal.

Clause 12. The method of any of clauses 1-11, wherein:
the target data is target transaction data; and
the historical data is the historical transaction data.

Clause 13. A data processing method comprising:
generating target data, the target data carrying a parameter set, the parameter set including at least a target posture parameter of a mobile terminal, the parameter set being a basis to determine that the target data is false data such that a server obtains a historical parameter set in historical data corresponding to the mobile terminal and, in response to determining that the parameter set satisfies a preset condition according to the historical parameter set, determines that the target data is false data, the historical parameter set including at least a historical posture parameter of the mobile terminal, the parameter set satisfying the preset condition including at least that a posture variation between the target posture parameter in the parameter set and the historical posture parameter in the historical parameter set is less than a preset variation threshold; and
sending the target data to the server.

Clause 14. The method of clause 13, wherein the parameter set also includes a sending time of the target data and/or a location identifier of the mobile terminal.

Clause 15. The method of clause 13, further comprising:
receiving response information sent by the server, wherein:
the response information is sent by the server to respond to the target data after the server determines that the parameter set does not satisfy the preset condition.

Clause 16. The method of any of clauses 13-15, wherein:
the target data is target transaction data; and
the historical data is the historical transaction data.

Clause 17. A data processing apparatus comprising:
a target data receiving module that receives target data sent by a mobile terminal, the target data carrying a parameter set, the parameter set including at least a target posture parameter of the mobile terminal;
a historical parameter set obtaining module that obtains a historical parameter set in historical data corresponding to the mobile terminal, the historical parameter set including at least a historical posture parameter of the mobile terminal; and
a false data determining module that, in response to determining that the parameter set satisfies a preset condition according to the historical parameter set, determines that the target data is false data, the parameter set satisfying the preset condition including at least that a posture variation between the target posture parameter in the parameter set and the historical posture parameter in the historical parameter set is less than a preset variation threshold.

Clause 18. The apparatus of clause 17, wherein:
the parameter set further includes a sending time of the target data; and
the false data determining module further determines ae time interval that the mobile terminal sends data is less than a preset time length, the time interval being determined by the sending time of the target data and a sending time of the historical data in the historical parameter set.

Clause 19. The apparatus of clause 18, wherein:
the parameter set further includes a location identifier of the mobile terminal; and
the false data determining module further determines that locations of the mobile terminal and the set of historical false terminal are within a preset range according to the location identifier, the set of historical false terminal including one or more historical false terminals.

Clause 20. The apparatus of clause 17, further comprising:
a blocking module that blocks the false data; and
a false terminal determining module that determines the mobile terminal as a false terminal.

Clause 21. The apparatus of clause 17, further comprising:
a response information sending module that, when the parameter set does not satisfy the preset condition, in response to the target data, sends response information to the mobile terminal.

Clause 22. The apparatus of any of clauses 17-21, wherein:
the target data is target transaction data; and
the historical data is the historical transaction data.

Clause 23. A data processing apparatus comprising:
a target data generating module that generates target data, the target data carrying a parameter set, the parameter set including at least a target posture parameter of the mobile terminal, the parameter set being a basis to determine that the target data is false data such that a server obtains a historical parameter set in historical data corresponding to the mobile terminal and, in response to determining that the parameter set satisfies a preset condition according to the historical parameter set, determines that the target data is false data, the historical parameter set including at least a historical posture parameter of the mobile terminal, the parameter set satisfying the preset condition including at least that a posture variation between the target posture parameter in the parameter set and the historical posture parameter in the historical parameter set is less than a preset variation threshold; and
a target data sending module that sends the target data to the server.

Clause 24. The apparatus of clause 23, further comprising:
a response information sending module that receives response information sent by the server, the response information being sent by the server to respond to the target data after the server determines that the parameter set does not satisfy the preset condition.

Clause 25. The apparatus of clause 23 or 24, wherein:
the target data is target transaction data; and
the historical data is the historical transaction data.

Clause 26. A data processing system comprising:
a mobile terminal; and
a server,
wherein:
the mobile terminal generates target data and sends the target data to the server; and
the server receives the target data sent by the mobile terminal, the target data carrying a parameter set, the parameter set including at least a target posture parameter of the mobile terminal; obtains a historical parameter set in historical data corresponding to the mobile terminal, the historical parameter set including at least a historical posture parameter of the mobile terminal; and in response to determining that the parameter set satisfies a preset condition according to the historical parameter set, determines that the target data is false data, the parameter set satisfying the preset condition including at least that a posture variation between the target posture parameter in the parameter set and the historical posture parameter in the historical parameter set is less than a preset variation threshold.

Clause 27. The system of clause 26, wherein:
the target data is target transaction data; and
the historical data is the historical transaction data.

What is claimed is:
1. A method comprising:
receiving, by a server, target data sent by a mobile terminal, the target data carrying a plurality of parameter sets including at least a plurality of timewise adjacent parameter sets, each parameter set including at least a target posture parameter of the mobile terminal and a location identifier of the mobile terminal;
obtaining, by the server, a historical parameter set in historical data corresponding to the mobile terminal, the historical parameter set including at least a historical posture parameter of the mobile terminal;
in response to the server determining that, for each of a plurality of timewise adjacent parameter sets, a change in a parameter over adjacent times satisfies a preset condition according to the historical parameter set, determining, by the server, that the target data is false data, wherein the server determining that the change in the parameter over adjacent times satisfies the preset condition includes determining, by the server, that locations of the mobile terminal and a set of historical false terminals are within a preset range according to the location identifier and includes determining, by the server, that a posture variation between the target posture parameter in a parameter set of the plurality of parameter sets and the historical posture parameter in the historical parameter set is less than a preset variation threshold, the set of historical false terminals including one or more historical false terminals;
blocking, by the server, the false data after, in response to the server determining that the parameter set satisfies the preset condition according to the historical parameter set, determining that the target data is false data;
determining, by the server, that the mobile terminal is a false terminal; and
adding, by the server, the mobile terminal to the set of historical false terminals;
wherein:
the target posture parameter includes:
an angle $\alpha_1$ between the mobile terminal and a magnetic north;
an angle of rotation $\beta_1$ that the mobile terminal is rotated about a horizonal axis X; and
an angle of rotation $\gamma_1$ that the mobile terminal is rotated about a horizonal axis Z;
the historical posture parameter includes:
a historical angle $\alpha_2$ between the mobile terminal and the magnetic north;
an angle of rotation $\beta_2$ that the mobile terminal is rotated about the horizonal axis X; and
an angle of rotation $\gamma_2$ that the mobile terminal is rotated about the horizonal axis Z; and the posture variation between the target posture parameter in the parameter set and the historical posture parameter in the historical parameter set is determined by using a value calculated from a formula $\sqrt{(\alpha_1-\alpha_2)^2+(\beta_1-\beta_2)^2+(\gamma_1-\gamma_2)^2}$.

2. The method of claim 1, wherein:
the parameter set further includes a sending time of the target data; and
the parameter set satisfying the preset condition includes that a time interval that the mobile terminal sends data is less than a predetermined time length, the time interval being determined by the sending time of the target data and a sending time of historical data in the historical parameter set.

3. The method of claim 2, wherein a process to determine the time interval includes:
using a latest time that the mobile terminal sends data as the sending time of the historical data; and
determining a time difference between the sending time of the target data and the sending time of the historical data as the time interval.

4. The method of claim 1, wherein:
when the set of historical false terminal includes multiple historical false terminals, a distance between adjacent historical false terminals is less than a preset distance threshold.

5. The method of claim 3, wherein:
the location identifier includes latitude and longitude data when the mobile terminal sends the target data; and
a process determining that locations of the mobile terminal and the set of historical false terminal are within the preset range according to the location identifier includes:
determining latitude and longitude data of the set of historical false terminal;
calculating a distance between the latitude and longitude data of the mobile terminal that sends the target data and the latitude and longitude data of the set of historical false terminal; in response to determining that the distance is less than a preset distance threshold, determining that the locations of the mobile terminal and the set of historical false terminal are within the preset range.

6. The method of claim 5, wherein the latitude and longitude data of the set of historical false terminal includes latitude and longitude data of center points of shapes of various historical false terminals in the set of historical false terminal.

7. The method of claim 3, wherein:
the location identifier includes a base station identifier of a base station whose coverage includes the mobile terminal when the mobile terminal sends the target data; and
a process determining that locations of the mobile terminal and the set of historical false terminal are within the preset range according to the location identifier includes:
determining, by the server, the base station identifier of the set of historical false terminal; in response to determining that the base station identifier of the base station that the mobile terminal uses to send the target data coincides with the base station identifier of the set of historical false terminal, determining that the locations of the mobile terminal and the set of historical false terminal are within the preset range.

8. The method of claim 7, wherein:
the base station identifier is a Cell Global Identifier (CGI).

9. The method of claim 3, wherein:
the location identifier includes a WIFI hotspot identifier of a WIFI hotspot whose coverage includes the mobile terminal when the mobile terminal sends the target data; and
a process determining that locations of the mobile terminal and the set of historical false terminal are within the preset range according to the location identifier includes:
determining, by the server, a WIFI hotspot identifier of the set of historical false terminal; in response to determining that the WIFI hotspot identifier of the WIFI hotspot that the mobile terminal uses to send the target data coincides with the WIFI hotspot of the set of historical false terminal, determining that the locations of the mobile terminal and the set of historical false terminal are within the preset range.

10. The method of claim 9, wherein:
the WIFI hotspot identifier is a service set identifier (SSID) or a basic service set identification (BSSID).

11. The method of claim 1, further comprising:
after, in response to determining that the parameter set satisfies the preset condition according to the historical parameter set, determining that the target data is false data,
blocking the false data.

12. The method of claim 1, further comprising:
in response to the server determining that the parameter set does not satisfy the preset condition, in response to the target data, sending, by the server, response information to the mobile terminal.

13. The method of claim 1, wherein:
the target data is target transaction data; and
the historical data is the historical transaction data.

14. A method comprising:
generating, by a data processing apparatus, target data, the target data carrying a plurality of parameter sets including at least a plurality of timewise adjacent parameter sets and, for each parameter set, a change in a parameter over adjacent times, each parameter set including at least a target posture parameter of a mobile terminal and a location identifier of the mobile terminal; and
sending, by a data processing apparatus, the target data;
wherein the parameter set is a basis to determine that the target data is false data such that a server obtains a historical parameter set in historical data corresponding to the mobile terminal and, in response to determining that the parameter set satisfies a preset condition according to the historical parameter set, determines that the target data is false data, blocks the false data, determines that the mobile terminal is a false terminal, and adds the mobile terminal to the set of historical false terminals, the historical parameter set including at least a location identifier of the mobile terminal, the parameter set satisfying the preset condition including at least that locations of the mobile terminal and a set of historical false terminals are within a preset range according to the location identifier and includes at least that a posture variation between the target posture parameter in a parameter set of the plurality of parameter sets and the historical posture parameter in the historical parameter set is less than a preset variation threshold, the set of historical false terminals including one or more historical false terminals;

wherein:
the target posture parameter includes:
an angle $\alpha_1$ between the mobile terminal and a magnetic north;
an angle of rotation $\beta_1$ that the mobile terminal is rotated about a horizonal axis X; and
an angle of rotation $\gamma_1$ that the mobile terminal is rotated about a horizonal axis Z;
the historical posture parameter includes:
a historical angle $\alpha_2$ between the mobile terminal and the magnetic north;
an angle of rotation $\beta_2$ that the mobile terminal is rotated about the horizonal axis X; and
an angle of rotation $\gamma_2$ that the mobile terminal is rotated about the horizonal axis Z; and
the posture variation between the target posture parameter in the parameter set and the historical posture parameter in the historical parameter set is determined by using a value calculated from a formula $\sqrt{(\alpha_1-\alpha_2)^2+(\beta_1-\beta_2)^2+(\gamma_1-\gamma_2)^2}$.

15. The method of claim 14, wherein the parameter set also includes a sending time of the target data or a location identifier of the mobile terminal.

16. An apparatus comprising:
one or more processors; and
one or more memories storing thereon computer-readable instructions that, when executed by the one or more processors, cause the one or more processors to perform acts comprising:
receiving target data sent by a mobile terminal, the target data carrying a plurality of parameter sets including at least a plurality of timewise adjacent parameter sets, each parameter set including at least a target posture parameter of the mobile terminal and a location identifier of the mobile terminal;
obtaining a historical parameter set in historical data corresponding to the mobile terminal, the historical parameter set including at least a historical posture parameter of the mobile terminal;
in response to determining that, for each of a plurality of timewise adjacent parameter sets, a change in a parameter over adjacent times satisfies a preset condition according to the historical parameter set, determining that the target data is false data, the parameter set satisfying the preset condition including at least that a posture variation over the adjacent times between the target posture parameter in the parameter set and the historical posture parameter in the historical parameter set is less than a preset variation threshold, wherein determining that the parameter set satisfies the preset condition includes determining that locations of the mobile terminal and a set of historical false terminals are within a preset range according to the location identifier and includes determining that a posture variation between the target posture parameter in a parameter set of the plurality of parameter sets and the historical posture parameter in the historical parameter set is less than a preset variation threshold, the set of historical false terminals including one or more historical false terminals;
blocking the false data after, in response to determining that the parameter set satisfies the preset condition according to the historical parameter set, determining that the target data is false data;
determining that the mobile terminal is a false terminal; and
adding the mobile terminal to the set of historical false terminals;
wherein:
the target posture parameter includes:
an angle $\alpha_1$ between the mobile terminal and a magnetic north;
an angle of rotation $\beta_1$ that the mobile terminal is rotated about a horizonal axis X; and
an angle of rotation $\gamma_1$ that the mobile terminal is rotated about a horizonal axis Z;
the historical posture parameter includes:
a historical angle $\alpha_2$ between the mobile terminal and the magnetic north;
an angle of rotation $\beta_2$ that the mobile terminal is rotated about the horizonal axis X; and
an angle of rotation $\gamma_2$ that the mobile terminal is rotated about the horizonal axis Z; and
the posture variation between the target posture parameter in the parameter set and the historical posture parameter in the historical parameter set is determined by using a value calculated from a formula $\sqrt{(\alpha_1-\alpha_2)^2+(\beta_1-\beta_2)^2+(\gamma_1-\gamma_2)^2}$.

* * * * *